(12) United States Patent
Anderson et al.

(10) Patent No.: US 7,092,133 B2
(45) Date of Patent: Aug. 15, 2006

(54) POLYTOPIC MULTIPLEX HOLOGRAPHY

(75) Inventors: Kenneth E. Anderson, Boulder, CO (US); Kevin R. Curtis, Longmont, CO (US)

(73) Assignee: Inphase Technologies, Inc., Longmont, CO (US)

( * ) Notice: Subject to any disclaimer, the term of this patent is extended or adjusted under 35 U.S.C. 154(b) by 0 days.

(21) Appl. No.: 10/680,780

(22) Filed: Oct. 6, 2003

(65) Prior Publication Data

US 2004/0179251 A1    Sep. 16, 2004

Related U.S. Application Data

(60) Provisional application No. 60/453,529, filed on Mar. 10, 2003.

(51) Int. Cl.
    *G03H 1/30* (2006.01)
(52) U.S. Cl. .............................. 359/25; 359/22; 359/24; 365/125; 365/216; 365/234
(58) Field of Classification Search ................ 359/22, 359/24–25, 35; 365/125, 216, 234
    See application file for complete search history.

(56) References Cited

U.S. PATENT DOCUMENTS

| 5,339,305 | A |   | 8/1994 | Curtis et al. |
| 5,483,365 | A |   | 1/1996 | Pu et al. |
| 5,550,779 | A |   | 8/1996 | Burr et al. |
| 5,661,577 | A |   | 8/1997 | Jenkins et al. |
| 5,703,705 | A | * | 12/1997 | Curtis et al. ............... 359/22 |
| 5,892,601 | A |   | 4/1999 | Curtis et al. |
| 5,892,801 | A |   | 4/1999 | Curtis et al. |
| 6,482,551 | B1 |  | 11/2002 | Dhar et al. |
| 2002/0015376 | A1 | * | 2/2002 | Liu et al. ................... 369/103 |

OTHER PUBLICATIONS

S. Tao et. al., "Spatioangular multiplexed storage of 750 holograms in an Fe:LiNbO3 crystal",Optics Letters, 18(11), pp. 912-914(1993).*
Barbastathis, G. et al. (Oct. 2000). "Volume Holographic Multiplexing Methods," In *Holographic Data Storage*. Coufal, H. et al., eds., Springer-Verlag, Inc., pp. 29-30 (Includes Table of Contents).
Burr, G. W. et al. (Apr. 2000). "Multiplexed Phase-Conjugate Holographic Data Storage with a Buffer Hologram," *Optics Letters* 25(7):499-501.

(Continued)

*Primary Examiner*—Leonidas Boutsikaris
(74) *Attorney, Agent, or Firm*—Morrison & Foerster LLP

(57) ABSTRACT

Disclosed is a multiplexing method and apparatus that allows holograms to be spatially multiplexed with partial spatial overlap between neighboring stacks of holograms. Each individual stack can additionally take full advantage of an alternate multiplexing scheme such as angle, wavelength, phase code, peristrophic, or fractal multiplexing, for example. An amount equal to the beam waist of the signal beam writing a hologram separates individual stacks of holograms. Upon reconstruction, a hologram and its neighbors will all be readout simultaneously. An filter is placed at the beam waist of the reconstructed data such that the neighbors that are read out are not transmitted to the camera plane. Alternatively, these unwanted reconstructions can be filtered out with an angular filter at an intermediate plane in the optical system that has a limited angular passband.

84 Claims, 13 Drawing Sheets

OTHER PUBLICATIONS

Curtis, K. et al. (Dec. 1994). "Three-Dimensional Disk-Based Optical Correlator," *Optical Engineering* 33(12):4051-4054.

Curtis, K. et al. (Jul. 1994). "Method for Holographic Storage Using Peristrophic Multiplexing," *Optics Letters* 19(13):993-994.

Fisher, R. A., ed. (Mar. 1993). *Optical Phase Conjugation*. Academic Press, Inc. pp. vii-xi (Table of Contents Only).

Kostuk, R. K. et al. (Oct. 2000). "Beam Conditioning Techniques for Holographic Recording Systems," *In Holographic Data Storage*. Coufal, H. J. et al., eds., Springer-Verlag, Inc., pp. 259-269 (Includes Table of Contents).

Li, H-Y. S. (Sep. 1994). "Photorefractive 3-D Disks for Optical Storage and Artificial Neural Networks," Chapter 4 *In* the Thesis in Partial Fulfillment of the Requirements for the Degree of Doctorate of Philosophy at the California Institute of Technology, Pasadena, California, (Submitted Sep. 15, 1994), pp. 78-112 (Includes Table of Contents).

Piazzolla, S. et al. (May 1992). "Single-Step Copying Process for Multiplexed Volume Holograms," *Optic Letters* 17(9): 676-678.

Rhodes, W. T. (Dec. 1979). "Hologram Copying," Chapter 9.3 *In Handbook of Optical Holography*, Caulfield, H. J., ed., Academic Press, Inc. pp. 373-377.

Tao, S. et al. (Jun. 1993). "Spationangular Multiplexed Storage of 750 Holograms in an Fe:LiNbO$_3$ Crystal," *Optics Letters* 18(11):912-914.

* cited by examiner

POLYTOPIC MULTIPLEX HOLOGRAPHY

CROSS REFERENCE TO RELATED APPLICATIONS

The present application claims priority to U.S. Provisional Patent Application No. 60/453,529, filed Mar. 10, 2003 entitled "A Method for Overlapping Holograms Using Location Based Filtering to Separate Out the Signal" which is incorporated by reference in its entirety.

BACKGROUND OF THE INVENTION

Multiplexing holograms means to store multiple holograms in the same volume or nearly the same volume. Typically, this is done by varying an angle, wavelength, phase code, or some other system parameter in the recording and readout setup. Many of these methods rely on a holographic phenomena known as the Bragg effect in order to separate the holograms even though they are physically located within the same volume of media. Other multiplexing methods such as shift and, to some extent, correlation use the Bragg effect and relative motion of the media and input laser beams to overlap multiple holograms in the same volume of the media.

Some multiplexing techniques use momentum (spatial frequency) to filter out the unwanted reconstructions from the desired reconstruction. Examples of these methods include: fractal, aperture (disclosed, for example, in U.S. Pat. No. 5,892,601 to Curtis et al for "Multiplex Holography, which is incorporated in its entirety by reference) and peristrophic multiplexing. Each of which is understood in the art. For disclosure of aperture multiplexing see U.S. Pat. No. 5,892,601 which is incorporated in its entirety by reference, and for a disclosure of peristrophic multiplexing see K. Curtis et al "Method of Holographic Storage Using Peristrophic Multiplexing", Optics Letters, Vol. 19, No. 13 pp. 993–994, 1994 and U.S. Pat. No. 5,483,365 to Pu et al. for "Method for holographic Storage using Persitrophic Multiplexing" each of which is incorporated in its entirety by reference. By changing the reference beam angle and moving the media between recordings, the reconstructions are still Bragg matched but come out at different angles and can therefore be filtered out.

Using holography to store data has been well known for the last 30 years. The idea of increasing system capacity by combining spatial multiplexing (recording holograms in multiple locations but not significantly in the same volume of media) along with some other multiplexing technique that overlaps holograms within the same location has been well known for over 15 years. These are standard techniques for distributing holograms on holographic media such as a disk, card, cube, or tape. Several patents and papers disclose a number of multiplexing techniques: U.S. Pat. No. 5,550,779, "Holographic Memory with Angle, Spatial and Out of Plane Multiplexing", and S. Li, "Photorefractive 3-D Disks for Optical Storage and Artificial Neural Networks" California Institute of Technology, pp. 78–111, 1994, each of which is hereby incorporated by reference. All of these place the beam waist, that is, the point at which the beam is focused and the beam spot size is smallest, (either image or Fourier transform plane) inside the media. By doing so, relatively small holograms can be generated which make excellent use of the media material's dynamic range.

FIG. 1 illustrates a prior art method of spatial and angle multiplexing holograms in a relatively thick media. FIG. 1 shows a holographic media 8 in which an angle multiplexed hologram is being created by reference beam 20a and signal beam 10a. In FIG. 1, signal beam 10a includes an incoming converging cone 12, an outgoing diverging cone 14 and a waist 16, where the signal beam is focused in the media 8 and where its spot size is smallest. FIG. 1 also shows reference beam 20b, which can be used to generated a second hologram in media 8 that is angle multiplexed with the hologram generated by reference beam 20a and signal beam 10a. A number of holograms, or stack, can be angle multiplexed in a portion 24 of the media. The media or signal source can the be shifted to record a second stack of holograms. FIG. 1 illustrates signal beams 10b, 10c and 10d which, along with reference beams shown in phantom, generate additional stacks of holograms in portions 24b, 24c, and 24d, respectively, of media 8. In FIG. 1, the portions 24a–24d of media 8 outline the area used by each stack.

Portions 24a–24d are significantly larger than an individual beam waist, such as beam waist 16. This is because both the signal beam and the reference beams determine the area that a given hologram stack uses. To spatially multiplex these holograms, stacks of holograms must be separated by at least the length of a portion 24a–24d of media 8. This has consequences for achievable densities and capacities that can be reached using holographic storage. High density is achieved by multiplexing more holograms in one location and by placing these stacks as close as possible. However, as discussed above, close spacing of stacks is limited.

Additionally, the divergence of a beam can limit the minimum distance between stacks. The amount of divergence, which can be expressed as the angle the edges of the diverging cone form with the direction of beam propagation, is dependent on the numerical aperture of a lens through which the signal beam is projected. For high NA systems that are typically used for storage systems, the amount of signal beam divergence in holographic media, such as media 8, is relatively significant for relatively thick media. In addition, the number of holograms that can be multiplexed at one place (one stack) is determined by the thickness of the media. More holograms can be stored in thicker media due to the increase in the Bragg selectivity and dynamic range. Unfortunately, if the media is made thicker the spatial stack size increases due to the increased divergence of the beam. Thus the achievable density/capacity saturates at a certain thickness. Thus, density cannot be increased significantly by increasing the material thickness once the saturation thickness is reached.

Increasing density is also possible by overlapping holograms. An example of this with angle multiplexing is disclosed in "Spatioangular Multiplexed Storage of 750 Holograms in an FeLiNbO3 Crystal", Optics Letters, Vol. 18, No. 11 pp. 912–914, 1993, which is incorporated in its entirety by reference. With this concept, partially overlapping hologram stacks are recorded with angle multiplexing within each stack. Each stack, however, has a unique set of angles and therefore, though the stacks partially overlap, the holograms can be easily separated. This increases the density of the stacks but many fewer holograms can be recorded in a stack, which very significantly reduces the density gains of overlapping the stacks. In practice this method results is very little if any increase in achievable density. When multiplexing holograms, however, the dynamic range of the holographic media can be a limiting factor. (The materials dynamic range or M# is a measure how many holograms can be multiplexed at a given location in the material and is related to the materials index change and material thickness.) Thus, the reduced possible number of angle multiplexed holograms was acceptable since it reduced the demands on the available dynamic range for a given overall density. This is because as more holograms are multiplexed in the same volume (i.e. angle multiplexed) the diffraction efficiency of the holograms drops depending the material dynamic range (M#) divided by the number multiplexed holograms squared. Now that better materials have been invented, a way of actually increasing the achievable density is needed.

BRIEF SUMMARY OF THE INVENTION

This invention describes a new holographic recording technique referred to herein as Polytopic multiplexing. This multiplexing technique allows holograms to be spatially multiplexed with partial spatial overlap between neighboring stacks of holograms. Each individual stack can additionally take full advantage of an alternate multiplexing scheme such as angle, wavelength, phase code, peristrophic, correlation, or fractal multiplexing. An amount equal to the beam waist of the data beam writing the hologram separates the individual stacks of holograms. Upon reconstruction, the data and its neighbors will all be readout simultaneously, however, an aperture (filter) is placed at the beam waist of the reconstructed data such that the neighbors that are read out don't make it to the camera plane and are thereby filtered out. Alternatively, these unwanted reconstructions can be filtered out with an angular filter having a limited angular passband.

In particular, in a method for forming and reproducing a hologram in accordance with the present invention a first hologram creating a first hologram in a holographic media using a first reference beam and a first signal beam, the first signal beam having a waist. A second hologram is created using a second reference beam that is the same as the first reference beam and a second signal beam, the second signal beam also has a waist. At least a portion of the second hologram is spatially overlapped with the first hologram. However, the first hologram is spatially separated from the second hologram such that no portion of the waist of the first signal beam occurs in the same location as any portion of the waist of the second signal beam. The first hologram is regenerated in a first portion of an output beam and at least the second hologram is regenerated in a second portion of the output beam. The output beam is filtered to substantially contain only a readout of the first hologram.

DETAILED DESCRIPTION OF VARIOUS EMBODIMENTS

Figure 1:
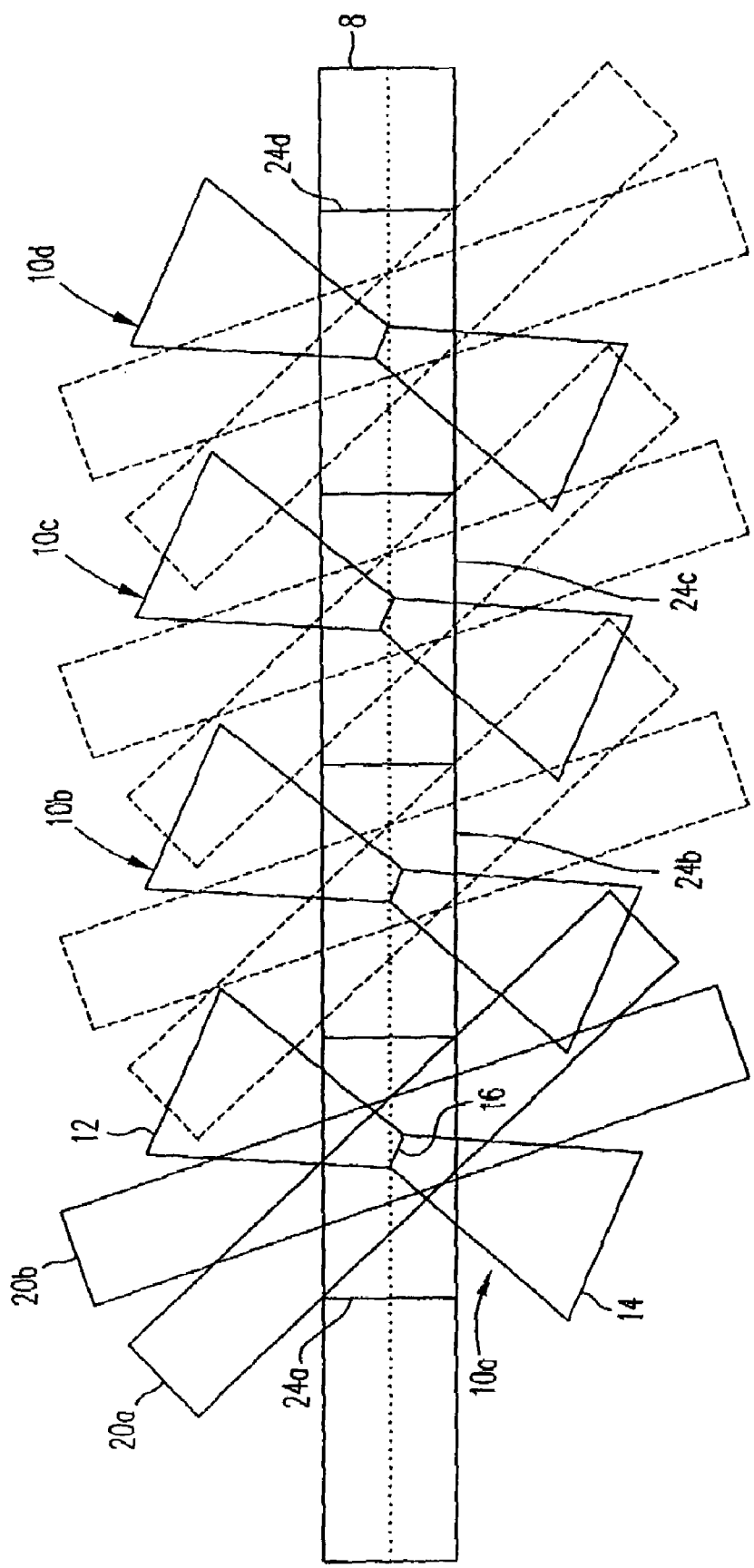
FIG. 1 is a diagram illustrating prior art multiplexing of multiplexed stacks of holograms in holographic media.
Figure 2:
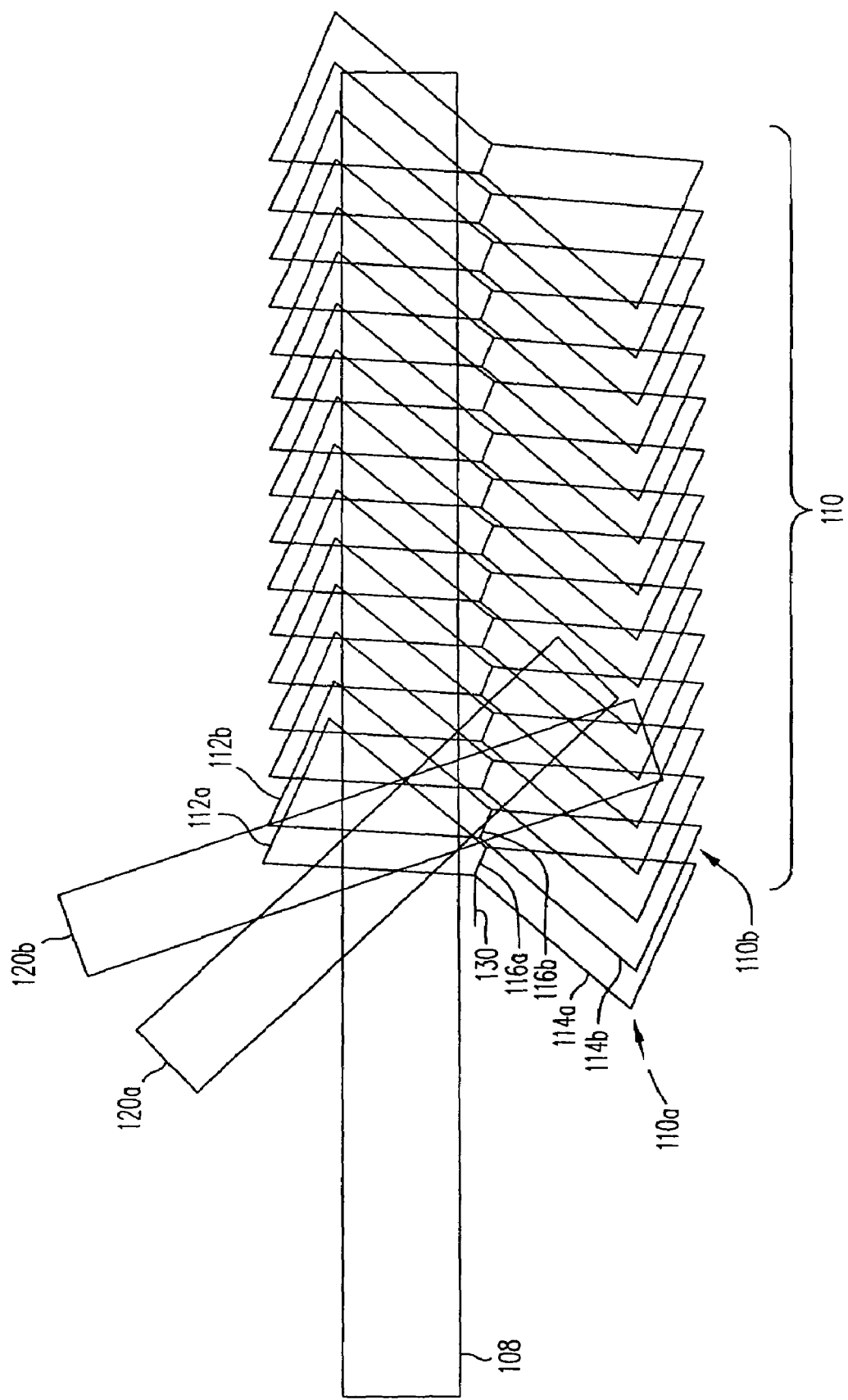
FIG. 2 is a diagram illustrating overlapping a plurality of multiplexed holograms in holographic media in accordance with the present invention.

A method of increasing the density of holograms stored in a holographic media in accordance with the present invention is illustrated in FIG. 2. FIG. 2 illustrates a holographic media 108 in which a plurality a holograms are generated by a plurality of signal beams 110. Each of the plurality of signal beams 110 include an incoming converging cone, and outgoing diverging cone and a beam waist. In particular, a first signal beam 110a includes a first incoming converging cone 112a, and a first outgoing diverging cone 114a and a first beam waist 116a. As used herein, the "waist" of a beam can indicate either the beams Fourier transform plane or image plane. In FIG. 2, beam waist 116a can be either the Fourier transform plane or the image plane. FIG. 2 also shows a first reference beam 120a and a second reference beam 120b. As is understood in the art, signal beam 110a and first reference beam 120a can generate a first hologram. A first additional signal beam (not shown) which can be spatially coincident with first signal beam 110a and contain different information that first signal beam 110a, can generate, as is also understood in the art, a first additional hologram that is angle, or otherwise, multiplexed with the first hologram at a first stack location in media 108 which is spatially coincident with converging cone 112a. As understood in the art, further additional holograms can be angle multiplexed together at this first stack location. It is considered that holograms multiplexed together in a single stack can be multiplexed by any method other than angle multiplexing including wavelength, peristrophic, correlation, or phase code multiplexing, for example.

A second signal beam 110b, which is not spatially coincident with first signal beam 110a, can generate a second hologram at a second stack location which is spatially coincident with a second converging cone 112b of second signal beam in media 108. Additional second holograms can be angle or otherwise multiplexed with the second hologram at the second stack location using additional second signal beams that are spatially coincident with, but carry different information from, second signal beam 110b.

Second signal beam 110b includes a second incoming convergence cone 112b, a second outgoing diverging cone 114b and a second beam waist 116b. As shown in FIG. 2, second signal beam 110b is directed such that second converging cone 112b partially spatially overlaps with first converging cone 112a of first signal beam 110a inside of media 108. As such, when reproducing the first hologram in an output beam, information from the second hologram (and potentially other holograms created by other signal beams 110) will be included in the output beam after the readout beam passes through media 108. Therefore, and as discussed in detail below, a filter block 130 adjacent to media 108 and in the path of a output beam, is used to filter out information from a second, and potentially other, holograms which will also be included in the output beam.

Such filtering of an output beam is possible because while second signal beam 110b is preferably directed such that second converging cone 112b partially spatially overlaps with first converging cone 112a, second signal beam 110b is also preferably directed such that second beam waist 116b does not spatially overlap with first beam waist 116a. Thus, filter block 130 is preferably placed at the location of the waist of the signal beam that generated the hologram that is desired to be reproduced. Filter block 130 is designed to allow a portion of an output beam containing information from only the first hologram and also having a waist at this location to pass substantially un-attenuated, while blocking readouts of holograms generated by signal beams that overlapped the signal beam that generated the desired hologram.

Figure 3:
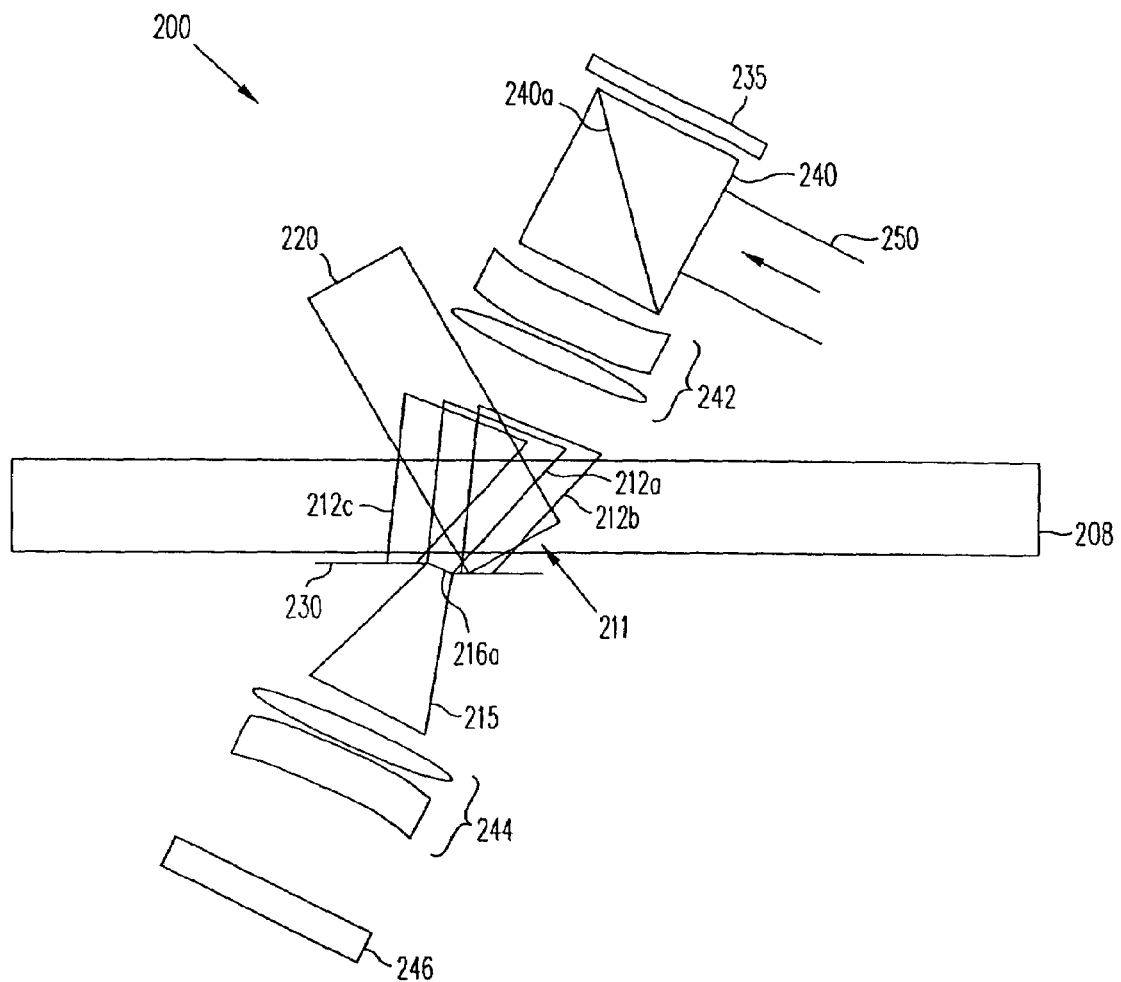
FIG. 3 illustrates a system and method for overlapping a plurality of multiplexed holograms using a signal beam having a beam waist outside the holographic media and reading out individual holograms in accordance with the present invention.

FIG. 3 is a diagram illustrating a holographic system 200 for carrying out a method in accordance with the present invention. Holographic system 200 is for generating and reading out holograms in holographic media 208. Holographic system 200 includes a reflective spatial light modulator (SLM) 235 for providing data for holograms to be recorded in media 208. SLMs are well understood by those skilled in the art. Adjacent to SLM 235 is a beam splitter 240 which directs an incident signal beam 250 off of partially reflecting mirror 240a, onto SLM 235 and through first Fourier transform (FT) lens 242, which, in the embodiment of FIG. 3, consists of 2 elements. Holographic system 200 also includes a second FT lens 244 for focusing a regenerated hologram onto a detector 246. It is also considered that FT lens 244 be a quasi-FT lens. Media 208 can be any media capable of storing holograms, but preferred media includes media available under the Tapestry™ brand name from Inphase technologies of Longmont, Colo. Such media includes a photopolymer disclosed in U.S. Pat. No. 6,482, 551 to Dahr et al. for "Optical Article and Process for Forming Article" which is incorporated by reference in its entirety. Also, media 208 can be in the form of a card having rectangular or other shape or in the form of a tape.

FT lens 242 directs incident signal beams through media 208 to generate, along with a reference beam 220, a plurality of holograms therein. As discussed above, a plurality of holograms may be multiplexed in known manners at a single location in media 208. After generating at least a first hologram at a first location in media 208, represented in FIG. 3 by a converging cone 212a, media 208 and the combination of SLM 235, beam splitter 240 and ST lens 242 can be shifted with respect to each other in a known manner to generate additional holograms, represented in FIG. 3 by converging cones 212b and 212c, which are not at the first location in media 208. As shown in FIG. 3, holograms at converging cones 212a, 212b and 212c preferably overlap with each other. As such, groups or stacks of multiplexed holograms are recorded in a line in media 208. As also discussed above, the waists of the incident beams generating the holograms at converging cones 212a, 212b and 212c however, do not spatially overlap.

It is to be understood that holograms generated at converging cones 212b and 212c may be generated using the same reference beam used to generate a hologram at converging cone 212a. As used herein, "same" reference beam indicates a reference beam having substantially the same characteristics such as angle of incidence, phase, and wavelength, for example, as a comparison reference beam but that may otherwise be shifted in space or time. As such the same reference beam can generate a hologram with two different signal beams at different times and at different locations. Thus, if there are a plurality of holograms angle multiplexed at converging cone 212a, holograms generated at converging cones 212b and 212c may be generated using reference beams having substantially the same multiplexing angles, phases, wavelengths, wavefronts, etc., as those generated at converging cone 212a even though the holograms at converging cones 212b and 212c will overlap with holograms at converging cone 212a of the same multiplexing angle, phase, wavelength, wavefront, etc.

FIG. 3 illustrates readout of a hologram generated in media 208 at converging cone 212a. A readout beam which is the same as reference beam 220 and is spatially coincident with reference beam 220 can be used to regenerate the hologram at converging cone 208. However, as discussed above, because holograms have also been created at converging cones 212b and 212c using the same reference beam that created the hologram at converging cone 212a, and which overlap with the hologram at converging cone 212a, the holograms at converging cones 212b and 212c will also be regenerated with a readout beam that is the same as reference beam 220 and spatially coincident therewith.

In order to avoid the holograms at converging cones 212b and 212c from be detected by detector 246, a filter block 230 is used to filter out the readouts generated from holograms at converging cones 212b and 212c. As noted above, signal beams generating holograms at converging cones 212a, 212b and 212c do not overlap at the beam waists. And, as shown in FIG. 3, the beam waists are positioned outside media 208. As such, filter block 230 can be positioned to allow a portion 215 of an output beam 211 carrying a readout of the hologram at converging cone 212a to pass through second FT lens 244 and into detector 246 while blocking portions of the output beam carrying readouts of the holograms at converging cones 212b and 212c.

Figure 4:
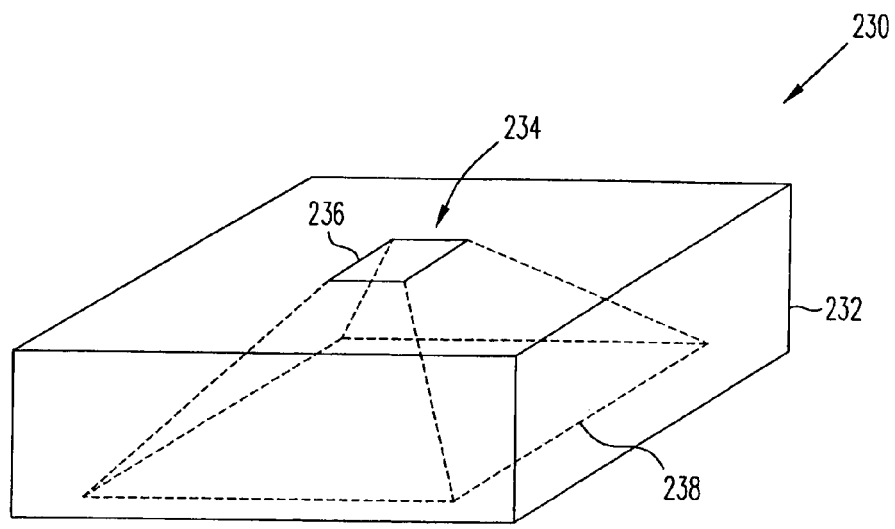
FIG. 4 is a diagram of a filter block for filtering out unwanted holographic readouts for use in a method and system in accordance with the present invention.
Figure 4A:
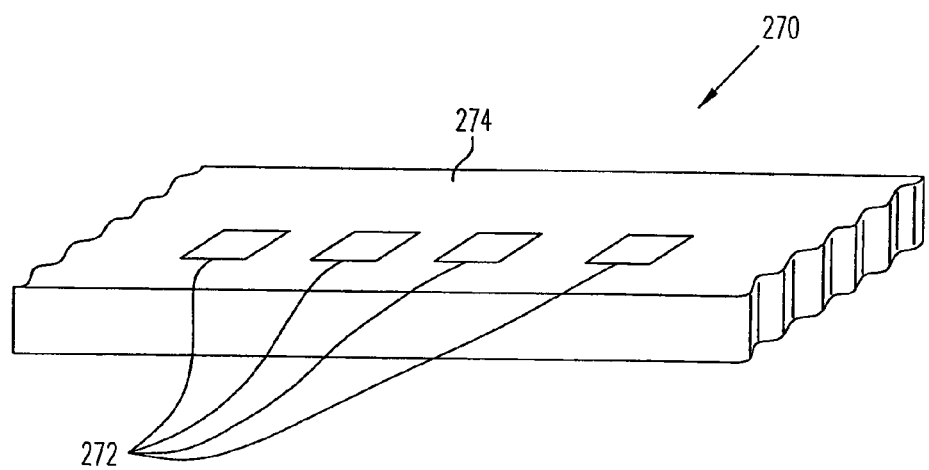
FIG. 4a is a diagram of holographic media including a filter for filtering out unwanted holographic readouts for use in a method and system in accordance with the present invention.

FIG. 4 is a diagram illustrating a filter block 230 which may be used to carryout such filtering. Filter block 230 preferably includes an opaque block 232 having a hollowed out area 234 in the form of a 4-sided truncated pyramid. Area 234 includes a first square aperture 236 in an upper face of opaque block 232 and a second square aperture 238 in a lower face of opaque block 232. Preferably, in use, filter block 230 is positioned such that upper aperture 234 is nearest to media 208 and is substantially perpendicular to the direction of propagation of output beam portion 215. To reproduce the hologram stored at converging cone 212a, filter block 230 is also preferably positioned such that the waist of a portion 211 of an output beam carrying a readout of the hologram at converging cone 212a can substantially pass through aperture 234 and the waists of the portions of the output beam that are reproducing holograms at converging cones 212b and 212c are blocked by filter block 230. Any filter can be made that limits the size of the beam waist. If the filter is in a relay system, as described below, the configuration of the block is less critical because the filter block can be placed further away from the media thus reducing physical interference with the reference beam and the media.

Figure 3A:
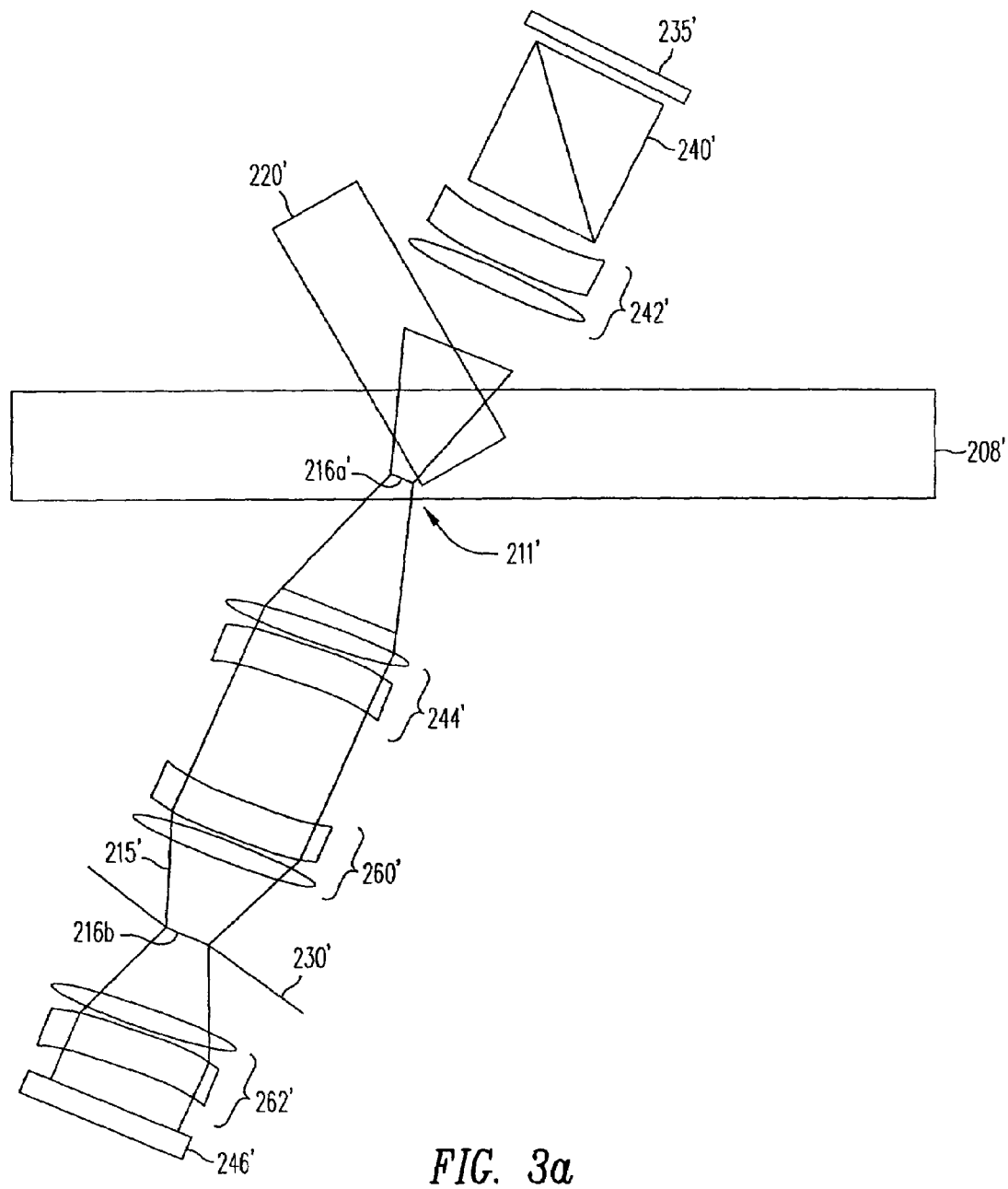
FIG. 3a illustrates a system and method for overlapping a plurality of multiplexed holograms using a signal beam having a beam waist inside the holographic media and relaying the beam waist to a location outside the holographic media in accordance with the present invention.

In the example illustrated in FIG. 3, the 2 FT lenses are in what is commonly called a 4F imaging system arrangement. System 200 could also be relayed by an additional 4F system between detector 246 and FT lens 244. Filter 230 can then be placed in the Fourier plane of this 4F system. This allows for the beam waist to be placed inside the media and still achieve filtering of unwanted hologram readouts and stack overlap. Such a system 200' is shown in FIG. 3a. System 200' includes an SLM 235', beam splitter 240' first FT lens 242', media 208' second FT lens 244' and detector 246', each as described above with respect to system 200. System 200' also includes an additional 4F lens system including third FT lens 260' and fourth FT lens 262' between second FT lens 244' and detector 246'. Additionally, a filter block is not placed between second FT lens 244' and media 208'. Rather, a filter block 230' is positioned between third FT lens 260' and fourth FT lens 262'. FT lenses 242', 244', 260' and 262' can also be quasi-FT lenses.

System 200' records multiplexed and overlapped holograms in media 208' as described above with respect to system 200. FIG. 3a illustrates readout of a hologram from media 208'. A readout beam 220', which is the same as a reference beam that was used to generate a hologram desired to be read, is used to generate an output beam 211' that includes a portion 215' which contains a readout of the desired hologram. After passing out of media 208' the output beam passes through second FT lens 244' and third FT lens 260', which focuses the output beam portion 215' to a second beam waist 216b before reaching fourth FT lens 262'. In system 200', holographic media 208' is preferably located at the Fourier transform place of the object beam of system 200'.

As discussed above, a reference beam that is the same as readout beam 220' was used to create holograms overlapping with the hologram readout in output beam portion 215'. Thus, readouts (not shown) of these additional holograms will also be included in the output beam 211 generated by readout beam 220'. Because, as discussed above, media 208' was shifted by at least a distance equal to the diameter of a beam waist 216b of signal beam 210, beam waists of portions of output beam 211 containing readouts of additional holograms will not overlap with second beam waist 216b of portion 215' of output beam 211. Thus, filter block 230' is preferably positioned to block transmission of portions of output beam 511 other than portion 215' at second beam waist 216b thereof. In this way, only portion 215' of output beam 211 is transmitted to fourth FT lens 262' and detector 246'. If there is magnification in system 200 enabled by lenses 244 and 260 then the distance to move the media is the magnified distance of the beam waist 216b.

By using a second 4F lens system including FT lenses 260' and 262' to generate a second beam waist 216b' of output beam portion 215' outside media 208', as shown in FIG. 3a, first beam waist 216a' can be placed inside media 208'. Having the beam waist inside the media has the advantage of making the best use of the material dynamic range. In addition, and as discussed below with respect to FIGS. 9 and 10, a 4F relay system could be placed between beam splitter 240' and the first FT lens 242'. A filter block like filter block 230' can then be placed at the beam waist generated before first FT lens 242' thus limiting the signal bandwidth and decreasing the size of generated holograms. This decreases the size of a stack in the holographic media and reduced higher order reflections of SLM 235'. A transmissive SLM can also be used and are well known in the art. Other lens arrangements to relay or image the aperture or the SLM image are also possible.

Additionally, aperture 234 must be sized to allow enough information to reproduce the hologram at converging cone 212a to pass. To accomplish this, the length of the sides of aperture 234 can be given by:

$$L=(\gamma)(\text{focal length})/\text{pixel diameter}$$

where "L" is the length of the sides of aperture 234, "γ" is the wavelength of output beam portion 215, "focal length" is the focal length of FT lens 242 used to generate the hologram, and "pixel diameter" is the diameter of a single pixel of SLM 235. The L calculated above, referred to as the Nyquist size or Nyquist aperture, is large enough to pass the information of the pixels but limit error rates. The Nyquist size L is the preferred size for aperture 234 though other sizes that are larger or smaller than the Nyquist size may also be used. For example, and without limitation, an aperture dimension of either ½L or 2L may also be used. Though filter block 230 includes square apertures 234 and 238, apertures in a filter block that may be used in accordance with the present invention may have an aperture of any shape. It is also contemplated to use aperture sizes not given by the above equation and which may yield more or less information about the hologram being reproduced. The smaller the aperture or passband of the filter, the more density gain is realized until the signal to noise ratio drops below the recoverable limit with reasonable error correction and filtering of the signal. Preferably, an average diameter of beam waist such as beam waist 216a, and therefore, the average side of an aperture 234, is on the order of 0.5 mm to 2 mm, but may be either larger or smaller.

As discussed above, the filter can be in the optical system but it is possible that the filter could be made part of the media. FIG. 4b is a diagram illustrating one example of a holographic media 270 including a filter for use in a method and apparatus of the present invention. Holographic media 270 is a rectangular strip of holographic media as understood in the art. However, media 270 includes an opaque top surface 274 having a plurality of square apertures 272. Media 270 is continuous within apertures 272, however opaque top surface 274 is interrupted within apertures 272 such that a beam projected onto opaque top surface 274 of media 270 may pass into media 270 through apertures 272. Thus, media 270 could be used, for example, in place of media 208 and filter block 230 in system 200. To maximize the density of holograms in system 200 using media 270, apertures 272 would be located on the side of the media closest to FT lens 244 and beam waists would be located at the face of media 270 containing apertures 272. Multiple apertures in media 274 allow stacks of holograms to be multiplexed at multiple locations in media 270.

It is also considered that an angular filter, discussed in detail below, be used in a method an apparatus of the present invention in place of a filter block, such as filter block 230, or media 270.

Preferably, when media 208 or 208' is shifted to record additional holograms therein, it is preferably shifted by a distance substantially equal to the diameter of beam waist 210. In this way, the density of the holograms recorded in media 208 or 208' can be made relatively high. And because it is only necessary to shift media 208 or 208' by the diameter of a beam waist, rather than the largest diameter of the signal beam 210 inside media 208 or 208', media 208 or 208' can advantageously record a relatively greater number of holograms.

Further, because a method and apparatus in accordance with the present invention can accommodate holograms generated by the same reference beam and which can overlap at any point except that which coincides with the signal beam waist, the amount of divergence in a signal beam is less relevant. This provides at least two additional advantages. First, relatively higher numerical aperture lenses may be used to generate the signal beam without reducing the density of holograms that can be recorded in media 208 by system 200. This is because the increased beam divergence of a higher numerical aperture lens has no effect on the geometrical limit to density of holograms that can be recorded in media 208. A second advantage is that relatively greater thickness media can be used without decreasing the density of the holograms recorded in the media because, as discussed above, overlapping of any portion of a signal beam generating a hologram using the same reference beam does not effect readout of the hologram. Thus, overlapping of converging cones or diverging cones in a signal beam near the edges of relatively thick media is acceptable.

It is also considered that the method discussed above with respect to system 200 can be used in systems using holographic optical elements (HOE's) that function as lenses. HOE's are well known to those skilled in the art and disclosed, for example, in U.S. Pat. No. 5,661,577 entitled "Incoherent/Coherent Double Angularly Multiplexed Volume Holographic Optical Elements", which is incorporated in its entirety by reference.

Figure 5:
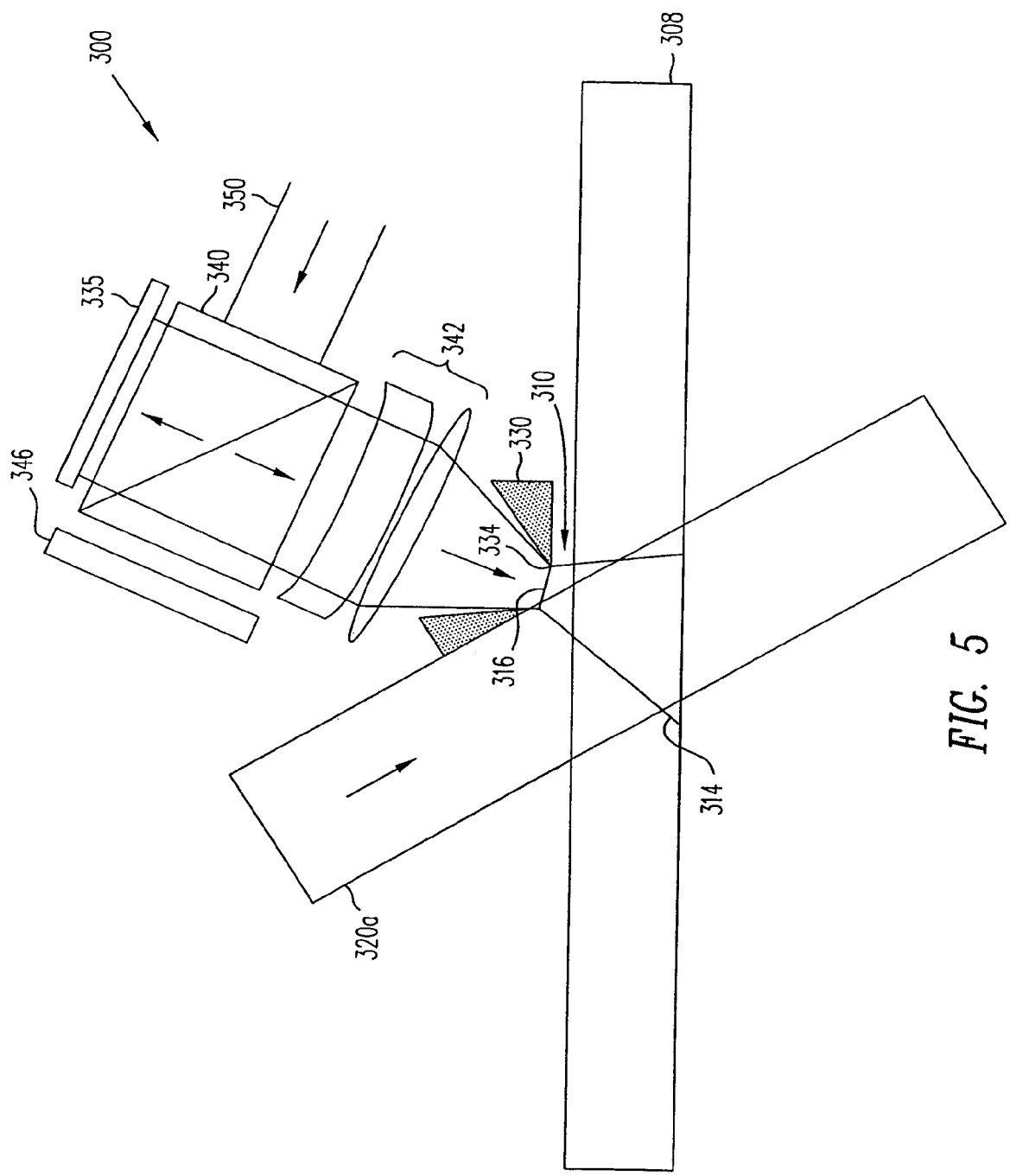
FIG. 5 illustrates a system and method for overlapping a plurality of multiplexed holograms using a signal beam having a beam waist above the holographic media in accordance with the present invention.

FIG. 5 is an alternate embodiment of a holographic system 300 in accordance with the present invention for carrying out a method of the present invention. Holographic system 300 is set up to use what is referred to as phase conjugate readout or reconstruction. Phase conjugate readout is disclosed, for example, in "Optical Phase Conjugation" edited by Robert Fisher, Academic Press, 1993, ISBN 0-12-257740-X. Phase conjugate readout is also disclosed in G. W. Burr and I. Leyva, "Multiplexed Phase-Conjugate Holographic Data Storage with a Buffer Hologram", Optics Letters, 25(7), 499–501 (2000) which is hereby incorporated by reference. System 300 includes a reflective SLM, for encoding an incident signal beam with data to be stored in hologram, and a beam splitter 340 for directing an incident beam 350 into SLM 335 and through FT lens 342 to generate a signal beam 310. Signal beam 310 creates a hologram in holographic media 308 in a manner similar to that discussed above with respect to holographic system 200. System 300 also includes detector 346 which, as discussed below, is used during reproduction of a hologram.

Unlike system 200, FT lens 342 is focused to generate a beam waist 316 on the same side of media 308 as FT lens 342 rather than on an opposite side thereof. In this way, a diverging cone 314 of signal beam 310, along with a reference beam 320a, forms a hologram in media 308, as is understood in the art. System 300 also includes a filter block 330 which, as discussed below, is used during readout of a hologram and which is placed in the same side of media 308 as FT lens 342. Like filter block 230, filter block 330 includes an aperture 334 that is large enough to allow the waist 316 of signal beam 310 to pass there-through. As discussed above with respect to system 200, a plurality of holograms can be multiplexed (e.g. angle, phase, wavelength) at the same location in media 108. Additionally, as also discussed above, a plurality of holograms created using the same reference beam can be generated in holographic material 308 using signal beams (not shown in FIG. 5) which diverging cones overlap and which waists do not overlap.

Figure 6:
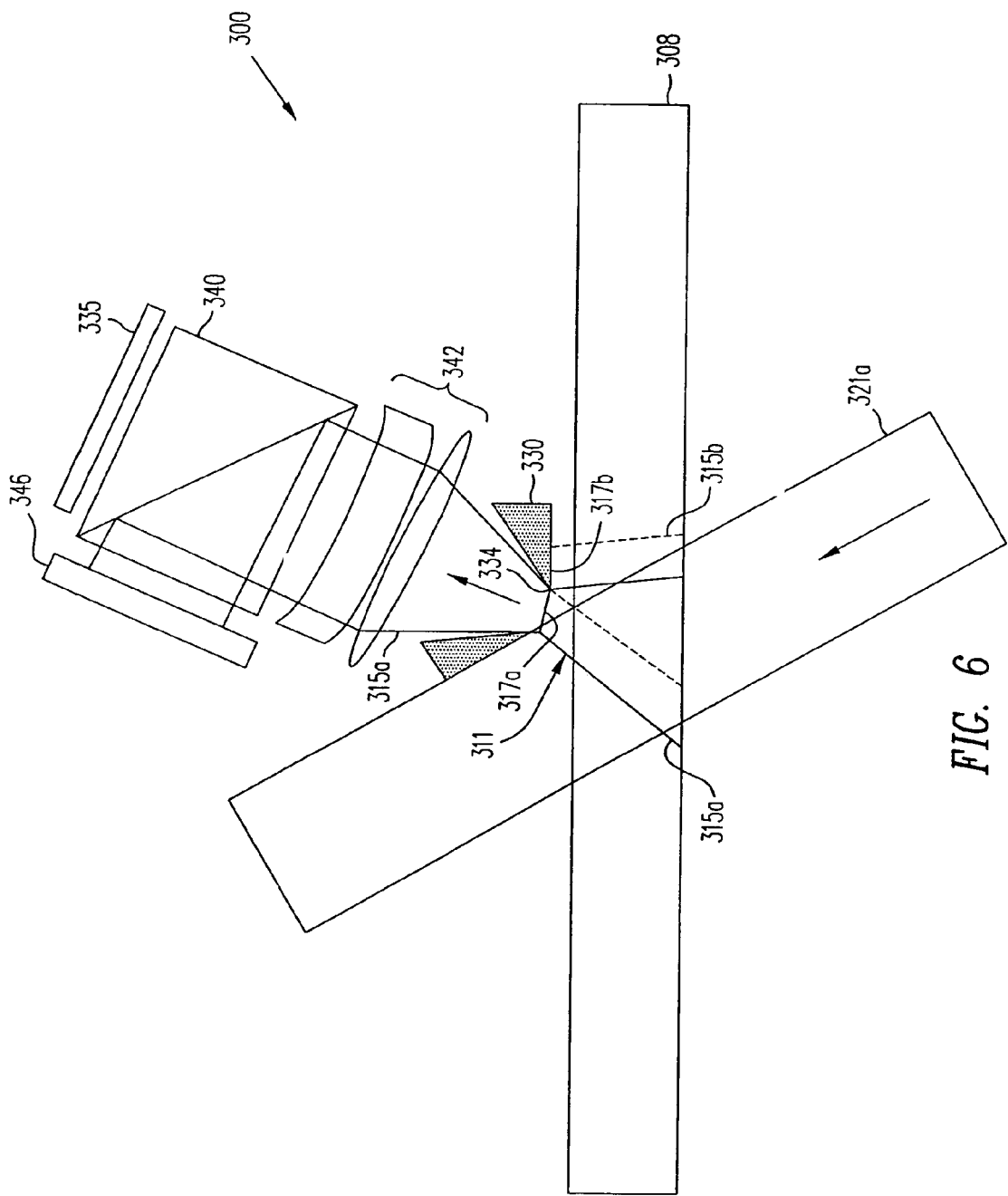
FIG. 6 illustrates phase conjugate readout of a hologram generated by the system and method shown in FIG. 5.

FIG. 6 illustrates the phase conjugate readout of a hologram in system 300. To readout a hologram, a phase conjugate readout beam 321a is directed into media 308. As used herein, phase conjugate readout beam indicates a readout beam that travels in a direction substantially diametrically opposite to that of the direction of a reference beam used to create a hologram, but is otherwise substantially the same as the reference beam used to create the hologram. Thus, readout beam 321a travels in substantially a diametrically opposite direction as reference beam 320a by is otherwise substantially the same as reference beam 320a. This generates an output beam 311 that has a first portion 315a which travels along a substantially opposite path from signal beam 310. As noted above, other holograms generated with the same reference beam as reference beam 320a overlap with the hologram created by signal beam 310. Thus, these other holograms will also be reproduced by reproduction beam 320b. One such reproduction is shown in FIG. 6 as included in a second portion 315b of output beam 311.

To filter output beam 311 such that only a portion 315a of output beam 311 that contains a reproduction of hologram created by signal beam 310 reaches detector 346, filter block 330 is placed in output beam 311. In particular, the aperture 334 of filter block 330 is placed at the waist 317a of first portion 315a of output beam 311 to allow the waist 317a to pass through aperture 334. As noted above, the waist of signal beams used to generate holograms overlapping with the hologram generated by signal beam 310 and reference beam 320a are not overlapped with the waist 316 of signal beam 310. Thus, when a second portion 315b of output beam 311 is also generated by reference beam 320b, filter block 330 is placed to filter out output beam second portion 315b at the waist 317b thereof. In this way, information from substantially only the hologram generated by signal beam 310 is transmitted through FT lens 342, into beam splitter 340 and onto detector 346.

As discussed above, a method and apparatus in accordance with the present invention facilitates the used of relatively high numerical aperture lenses. However, relatively high numerical aperture lenses of relatively high quality (e.g. having relatively low aberration and defects) can be relatively expensive to manufacture. However, use of phase conjugate reproduction reduces the importance of using a relatively high quality lens. This is because aberrations and distortion placed in a signal beam by a lens when a hologram is generated are removed by the lens from the reconstructed object beam as it passes the opposite direction back through the lens to be detected. Thus, a phase conjugate readout system, such as system 300, can advantageously generate relatively high quality images in a relatively cost effective manner. Further, in addition to filtering out unwanted reconstructions filter block 330 filters the original signal beam 310 to band-limit the signal before recording to reduce the size of the holograms, which is desirable.

Figure 7:
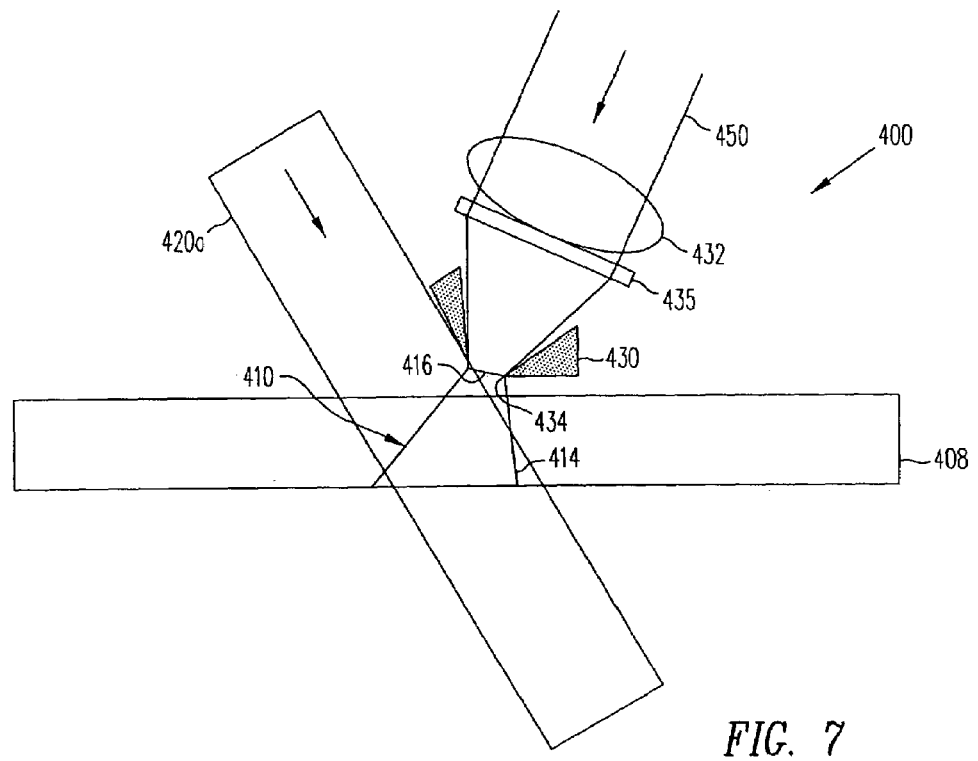
FIG. 7 illustrates a system and method for overlapping a plurality of holograms in a holographic media and including no lens between a spatial light modulator and the holographic media in accordance with the present invention.

A method and apparatus in accordance with the present invention can also be implemented using an imaging system that does not use a lens on readout. Such systems are disclosed, for example, in Holographic Data Storage, edited by Hans Coufal, Springer-Verlag, 2000, pp. 29–30, which is incorporated by reference. FIG. 7 is an illustration of an alternative embodiment of an apparatus and method of the present invention which can implement a lens-less readout of a hologram. FIG. 7 illustrates a holographic system 400 that includes a focusing lens 432 for focusing an incident beam 450 through a transmission SLM 435 that also includes a detector which is used on reproduction of a hologram by system 400. Transmission SLMs that also include a detector are well understood in the art.

Transmission SLM 435 encodes incident beam 450 with data to be recorded in a hologram in holographic media 408. Focusing lens 432 focuses signal beam to form a beam waist 416 outside of media 408 and on the same side of media 408 as SLM 435. A reference beam 420a is present in media 408 with a diverging cone 414 of signal beam 410 to create a hologram in media 408. System 400 also includes a filter block 430 having an aperture 434 at the location of beam waist 416 to allow signal beam 410 to pass through filter block 430 when recording a hologram. As discussed above with respect to systems 200 and 300, a plurality of holograms can be multiplexed at the same location in media 408 as signal beam 410 generates a hologram. Additionally, as also discussed above with respect to systems 200 and 300, media 408 can be shifted by at least an amount equal to the diameter of beam waist 416 of signal beam 410 to generate additional holograms in media 408 which use the same reference beam as reference beam 420a and which will overlap with a hologram created by signal beam 410.

Figure 8:
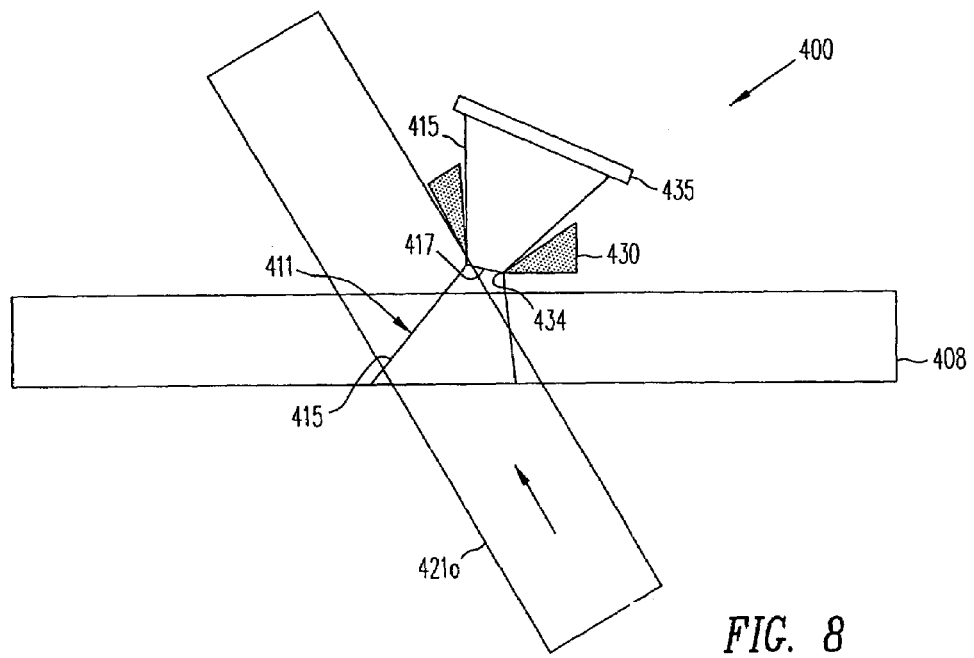
FIG. 8 illustrates lens-less, phase conjugate readout of a hologram generated by the system and method shown in FIG. 7.

FIG. 8 illustrates readout of a hologram in holographic system 400. Like system 300 discussed above, system 400 uses a phase conjugate readout beam 421a to reconstruct a hologram from media 408. Readout beam 421a will generate an output beam 411 which includes a first portion 415 that carries substantially only a reproduction of the hologram recorded by signal beam 410. First portion 415 of output beam 411 includes a waist 417 outside of media 408 at the aperture 434 of filter block 430. In this way, first portion 415 of output beam 411 can pass through block filter 430. As with systems 200 and 300 discussed above, additional portions (not shown in FIG. 8) of output beam 411 carrying information from additional holograms recorded in media 408 using reference beam 420a and overlapping with the hologram created from signal beam 410 will also be generated by phase conjugate readout beam 421a. However, because media 408 was shifted by at least an amount equal to the diameter of beam waist 416 of signal beam 410, filter block 430 blocks these additional portions of output beam 411 from reaching the detector of SLM 435.

Because no lens was used between SLM 435 and media 108 when generating a hologram in media 408, no lens is necessary when reproducing a hologram from media 408. This can advantageously reduce the cost and size of a holographic system such as system 400.

Figure 9:
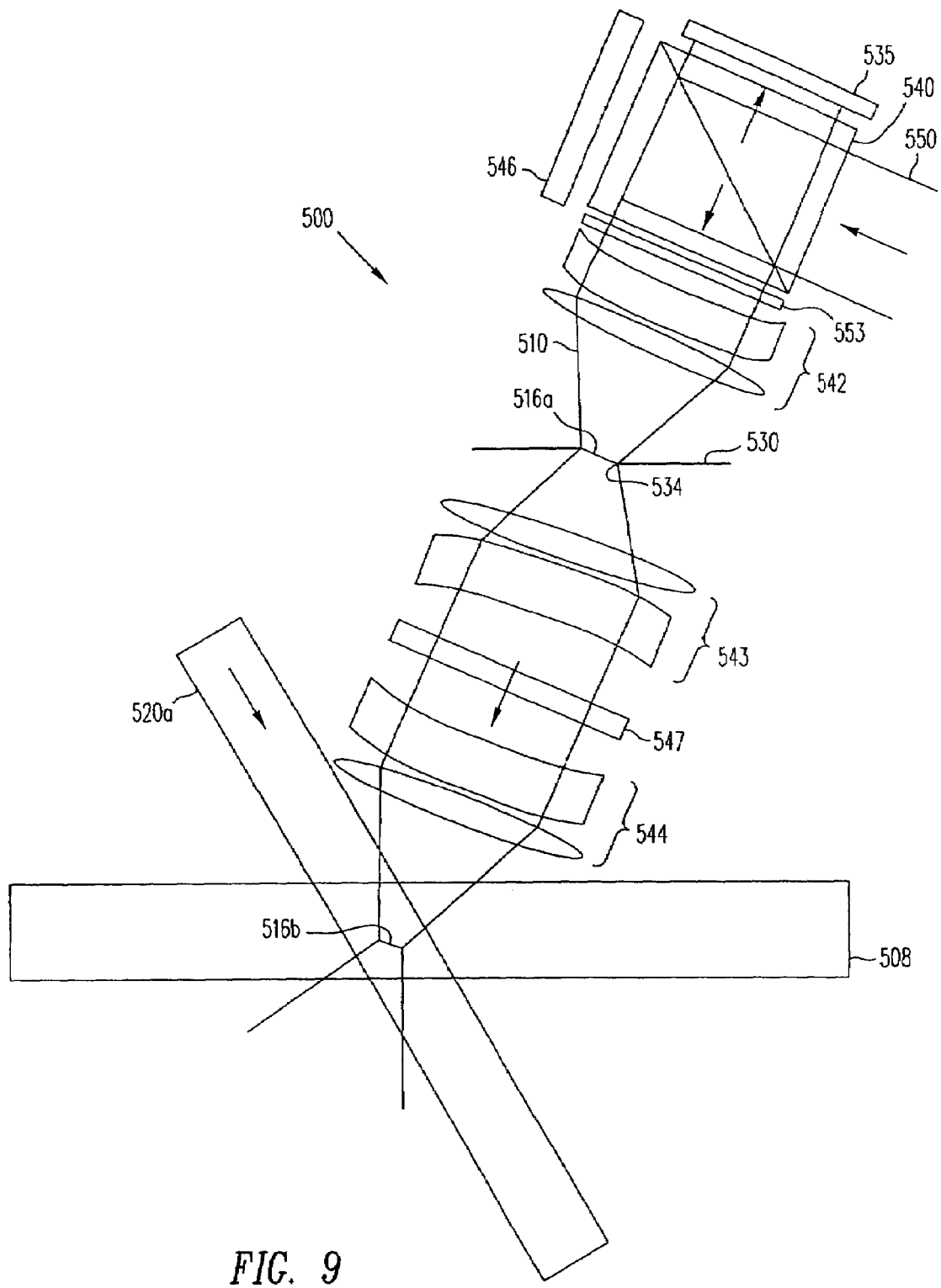
FIG. 9 illustrates a system and method for overlapping a plurality of holograms in a holographic media and including a relay lens system for relaying the waist of a signal beam to a location outside the holographic media in accordance with the present invention.

Systems 300 and 400 discussed above each created holograms using signal beams having waists outside of the holographic media. As discussed above with respect to FIG. 3a, however, it is also possible to implement a polytopic multiplexing system in which holograms are created using signal beams having waists inside the holographic media. FIG. 9 illustrates a holographic system 500 in accordance with the present invention and that generates holograms from signal beams that have waists inside the holographic media. System 500 includes a beam splitter 540 which directs an incident beam 550 into a reflective SLM 535 to create a signal beam 510. Signal beam 510 is then directed through a first FT lens 542. A filter block 530 having an aperture 534 is placed in the path of signal beam 510 after first FT lens 542. During recording filter block 530 can bandpass limit the frequency of the signal beam 510 thereby decreasing the size of a hologram generated by signal beam 510. FT lens 542 focuses signal beam 510 to a first waist 516a at the aperture 534 of filter block 530. Preferably, aperture 534 is sized to allow signal beam 510 to pass there-through. After passing through filter block 530, signal beam 510 diverges again to pass through a second FT lens 543 which straightens out signal beam again before it passes through a third lens 544, which focuses signal beam 544 to a second waist 516b, and which may or may not be an FT lens.

As shown in FIG. 9, second waist of signal beam occurs inside holographic media 508 where signal beam interferes with reference beam 520a to generate a hologram. As discussed above with respect to systems 200, 300 and 400, a plurality of holograms can be multiplexed at the same location in media 508 as signal beam 510 generates a hologram. Additionally, as also discussed above with respect to systems 200, 300 and 400, media 508 can be shifted by at least an amount equal to the diameter of second beam waist 516b of signal beam 510 to generate additional holograms in media 508 which use the same reference beam as reference beam 520a and which will overlap with a hologram created by signal beam 510.

When recording with a beam waist inside the media it is desirable to use a phase mask or phase element which shifts the phase of a beam passing therethrough to make the intensity in the material more uniform. This is well known in the art, and disclosed, for example, in "Holographic data storage", edited by Hans Coufal, Spinger-Verlag, pp 259–269 (2000) which is incorporated by reference. System 500 includes a phase element 547 between lenses 543 and 544, though phase element 547 can be placed anywhere in signal beam 510 between beam splitter 540 and media 508, directly on the SLM, or possibly in the illumination beam 550 right before beamsplitter 540. In order to make the beam more uniform in the media phase element 547 also makes the beam waist 516b larger. This decreases the density achievable using any method including polytopic. If, however, phase element 547 is placed in system 500 after the filter block 530, the size of aperture 534 does not have to be increased. This is advantageous in that it increases the achievable density.

Figure 10:
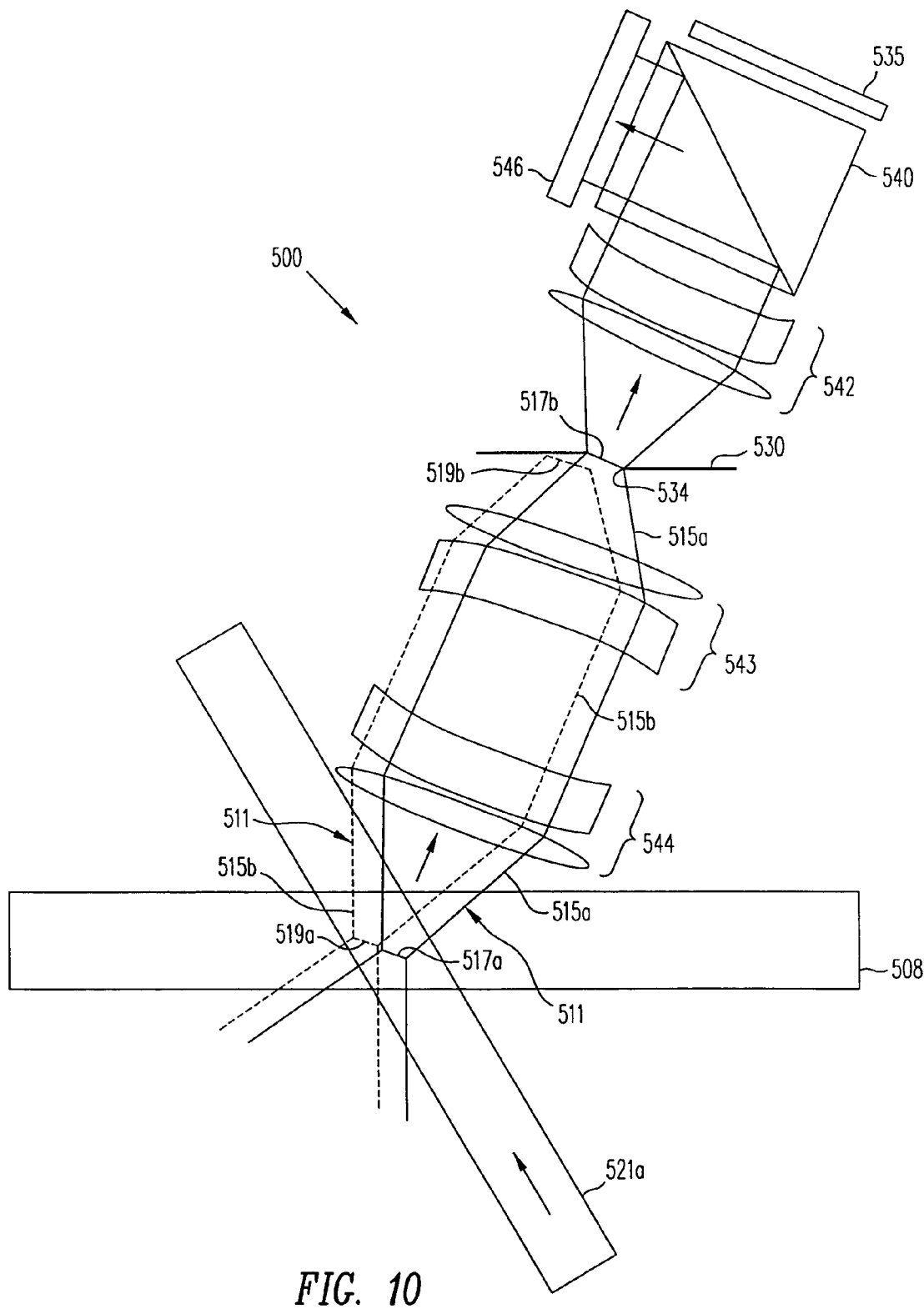
FIG. 10 illustrates phase conjugate readout of a hologram generated by the system and method shown in FIG. 9.

FIG. 10 illustrates readout of a hologram in holographic system 500. Like systems 300 and 400 discussed above, system 500 uses a phase conjugate readout beam 521a to regenerate a hologram from media 508. Readout beam 521a will generate an output beam 511 which includes a first portion 515a that carries substantially only a readout of the hologram recorded by signal beam 510. As shown in FIG. 10, first portion 515a of output beam 511 travels back along substantially the same path as signal beam 510, only in the opposite direction, through third FT lens 544 and second FT lens 543. Second FT lens 543 causes first portion 515a of output beam 511 to converge to a second beam waist 517b. Because first portion 515a of output beam 511 is traveling back along substantially the same path as signal beam 510, second waist 516b will occur at, and pass through, aperture 534 of filter block 530. First portion 515a of output beam 511 then passes through first FT lens 542, into beam splitter 540 and onto detector 546.

In system 500, it is also considered that the SLM and detector be co-located by using an integrated device with the detector elements in the back plane of the SLM. Such SLMs integrated with a detector are well understood in the art. This would result in a significant cost and size reduction. It is also considered to integrate a phase element such as phase element 547 into the SLM 535 or SLM/detector.

If an integrated SLM/detector is not used in system 500, beamsplitter 550 can be a polarizing beamsplitter. In such a case, a variable waveplate 553 may be positioned between beamsplitter 550 and first FT lens 542, though variable waveplate 553 may be positions anywhere in the path beamsplitter 550 and media 508. Other preferable locations for variable waveplate 553 are after the block 530 or near the image plane between lenses 543 and 542. On readout variable waveplate 553 is changed so that the reconstructed signal beam is routed to detector 546 using beamsplitter 550 with minimal loss of intensity.

Because, as discussed above, additional holograms were generated in media 508 using the same reference beam 520a that generated the hologram created by signal beam 510. These additional holograms also overlap with the hologram created by signal beam 510. Thus, readout beam 521a will also reconstruct at least portions of these additional holograms in output beam 511. As discussed above with respect to systems 200, 300 and 400, readouts of these additional holograms are filtered out of the output beam. In particular, FIG. 10 shows second portion 515b of output beam 511 which represents a readout of one of the additional holograms generated by the same reference beam 520a that generated the hologram created by signal beam 510 and which overlaps with the hologram created by signal beam 510. Second portion 515b of output beam 511 passes out of media 508 and through third FT lens 544 and second FT lens 543. Second FT lens 543 causes second portion 515b or output beam 511 to converge to a second beam waist 519b. Because, as discussed above, media 508 was shifted by at least a distance equal to the diameter of a beam waist 516b of signal beam 510, second beam waist 519b of second portion 515b of output beam 511 will not overlap with second beam waist 517b of first portion 515a of output beam 511. Thus, filter block 530 is preferably positioned to block transmission of second portion 515b of output beam 511 at second beam waist 519b thereof. Therefore, only first portion 515a of output beam 511 is transmitted to detector 546.

Figure 11:
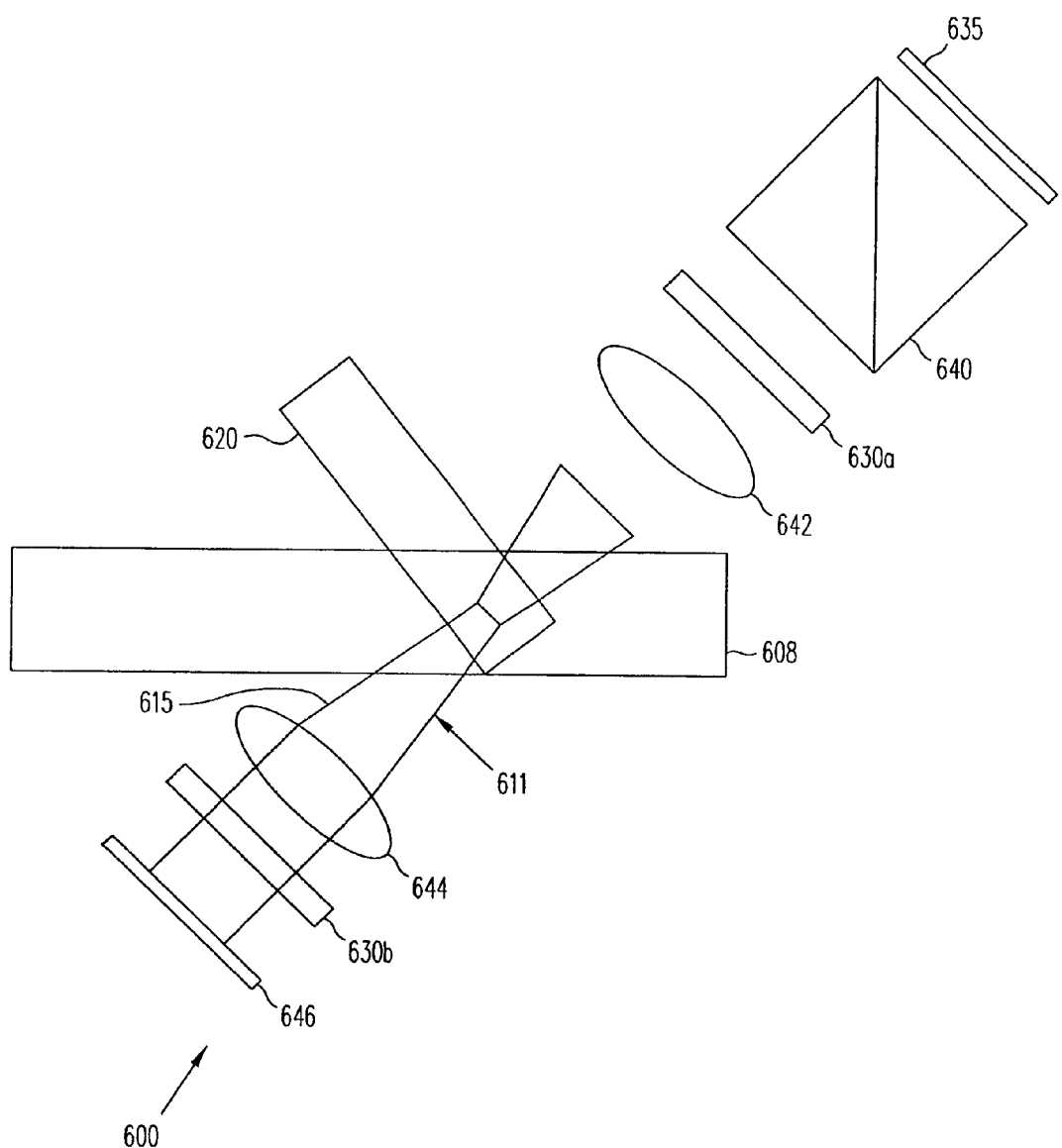
FIG. 11 illustrates a system and method for overlapping a plurality of holograms in a holographic media using two angular filters in accordance with the present invention.

As discussed above, the combination of FT lenses 544 and 543 act to recreate a first beam waist 517a, which is inside media 508, outside media 508 at the location of second waist 517b. As such, filtering of output beam 511 to remove portions thereof having unwanted hologram readouts can occur outside of media 508 even though second beam waist 516b of signal beam 510 occurs inside of media 508. Filter 534 also can band pass filter the object beam 510. In FIG. 11, the filtering of an object beam and output beam is realized in another fashion. FIG. 11 illustrates a system 600 in accordance with the present invention. System 600 includes a reflective SLM 635, beam splitter 640, first angular filter 630a and first lens 642. When recording a hologram in media 608, an incident beam is projected into beam splitter 640 to receive data from SLM 635 and pass through angular filter 630a and lens 642 and into holographic media 608 to record a hologram therein with a reference beam 620. In system 600, holographic media 608 is preferably located at the beam waist of the signal beam. In this way, multiple holograms can be angle, wavelength, correlation, peristrophic, fractal or otherwise multiplexed in media 608. As discussed above with respect to systems 200, 300, 400 and 500, media 608 can then be shifted by a distance at least a wide as the waist of a signal beam recording a hologram. The same reference beam can then be used to record additional stacks of holograms in media 608. The angle filters 630a and 630b are show on the SLM and detector sides of the lenses, but it is also possible for them to be on the media side of the lens.

FIG. 11 illustrates the readout of a hologram from media 608. A readout beam 620 is used to generate an output beam 611 that includes portions having readouts of multiple holograms that were each generated using a reference beam that was the same as readout beam 620 and that were overlapped in media 608. A first portion 615 of output beam 611 includes a readout of one such hologram. Output beam 611 passes through second lens 644, second angular filter 630b, and onto detector 646.

Angular filters 630a and 630b achieve the same filtering as an aperture filter block, such as filter block 230 discussed above, in the Fourier transform domain. Angular filters 630a and 630b operate to limit the angular bandwidth of the signal pixels in a Fresnel plane. That is, angular filters 630a and 630b filter out optical rays of the signal that are traveling at a certain cutoff angle relative to the optical axis of the system. Angular filters 630a and 630b can have different pass bands which are equivalent to different sized holes in the Fourier Plane. Angular filters 630a and 630b allow for the filtering of the signal beam to occur at intermediate planes in the system rather than near or at a Fourier plane or image plane. Angular filters 630a and 630b can be made by a multilayer thin film coating, similar to coating for notch filters and reflective coatings as is well known in the art, volume holographic gratings or a holographic optical element ("HOE"), or a combination of both.

Angular filter 630a is used before media 608 to limit the bandwidth of the signal beam such that holograms recorded in media 608 can be smaller. Angular filter 630b is used on readout to filter out unwanted hologram readouts from output beam 611. As shown in the example of FIG. 11, angular filter 630b allows substantially only first portion 615 of output beam 611 to pass to detector 646. It is also considered that a system and method in accordance with the present invention use angular filtering in reflection and phase conjugate geometries as well, both of which are well understood in the art. For example, without limitation, filter block 330 of system 300 discussed above could be replaced with an angular filter. It is also within the ambit of the present invention to use a combination of aperture filter blocks and angular filters. For example, an angular filter could be used in system 200, shown in FIG. 3, between SLM 240 and FT lens 242 to limit the bandwidth of the object beam of system 200. It is also considered that the filter blocks of systems 300, 400 and 500 be replaced with angular filters.

Many uses of holograms require making copies of a holographic "master" medium. The Handbook of Optical Holography, Academic Press 1979, pp. 373–377, incorporated by reference, describes replication of non multiplexed holograms. One method, "copying by reconstruction", first reconstructs the image and thereafter records a new hologram, using the reconstructed image. This method is applicable to thick as well as thin holograms. It has been used for multiplexed holograms by reconstructing and copying individual holograms one at a time. In addition, a whole "layer" of the media can be copied in at the same time—that is, all the holograms in the media multiplexed at a certain angle can be copied by reconstruction at the same time.

Figure 12:
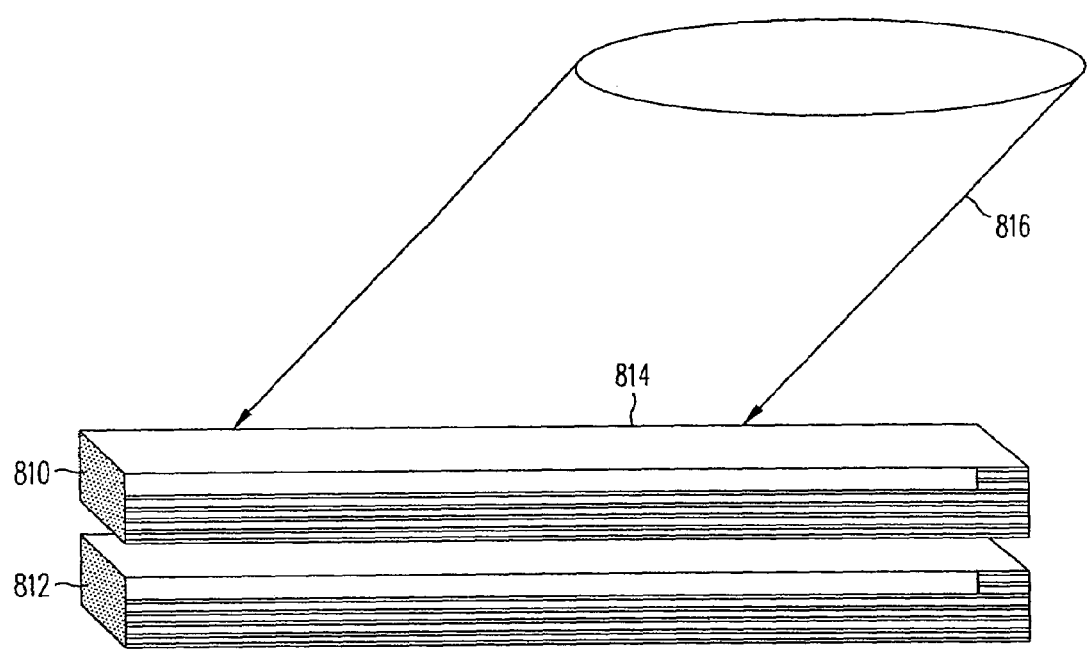
FIG. 12 illustrates a system and method for generating a reproduction of the holograms generated by a system and method in accordance with the present invention.

Copying by reconstruction can be included in a method an apparatus of the present invention. The multiplexing step still allows individual hologram reproduction or whole "layer" replication. Layer replication can be used for stacks of holograms that overlap with polytopic multiplexing. Layer replication of polytopic multiplexed holograms in accordance with the present invention is illustrated in FIG. 12. FIG. 12 illustrates prerecorded media 810 includes a plurality polytopic multiplexed stacks of holograms 814. Multiplexing of holograms 814 in individual stacks can be by angle, wavelength, phase or any other method. Blank media 812 is placed beneath prerecorded media 810. A readout beam 816 illuminates the plurality of multiplexed stacks of holograms 814 such that one hologram from each stack will be readout and copied into blank media 812. Readout beam 816 can then be altered (by wavelength, angle, phase, etc.) to cause a second hologram from each stack to be readout and copied into black media 812. In this way, each of the plurality of holograms 814 in prerecorded media 810 can be copied into blank media 812.

Alternatively multiple holograms or stacks of holograms can be simultaneously reconstructed and copied by use of multiple, mutually-incoherent reference beams. The reference beams would have different angles or wavelengths, etc depending on how the holograms were multiplexed in the stack. This would allow whole stacks to be copied at once. This procedure is analogous to the one described in Optics Letters, vol. 17, no 9, pp 676–678, which is incorporated by reference in its entirety. In using polytopic multiplexing the adjacent overlapping stacks or a "layers" in these stacks could be replicated with mutual-incoherent beams. This would significantly reduce cross talk noise during the replication process. Thus instead of one beam to replicate the entire "layer" of holograms, multiple mutually-incoherent beams could be used.

FIGS. 3 and 3a show examples of systems in accordance with the present invention in which the beam waist of the object beams is in the Fourier transform plane. And, FIG. 11 illustrates an example of a system in accordance with the present invention in which the beam waist is in the imaging plane. A system and method of the present invention can also be realized with a combination of Fourier Transform in one dimension and image plane in the other dimension. Such systems, not implementing polytopic multiplexing, are disclosed, for example, in U.S. Pat. No. 5,339,305 to Curtis et al. entitled "Disk-Based Optical Correlator and Method" and K. Curtis and D. Psaltis, "Three-dimensional Disk Based Optical Correlator", Optical Engineering, Vol. 33, No. 12, December 1994, both of which are incorporated by reference in their entirety.

Figure 13:
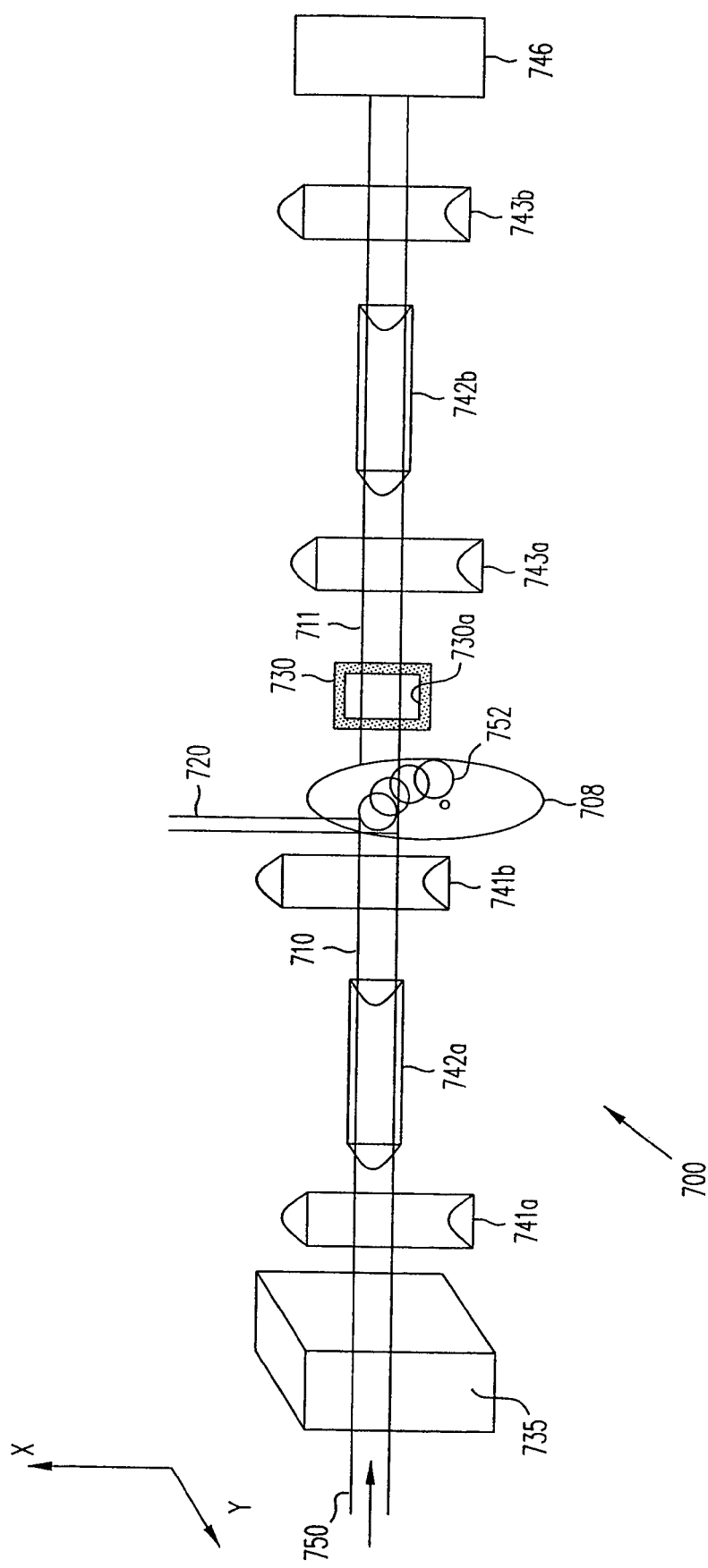
FIG. 13 illustrates a system and method for overlapping a plurality of holograms in a circular holographic media in accordance with the present invention.

An example of such a system is shown in FIG. 13. FIG. 13 illustrates an optical system 700. System 700 includes an SLM 735 through which an incident beam 750 is encoded with information to become signal beam 710. Though SLM 735 is a transmission SLM, it is within the ambit of the invention to also use a reflection SLM. Additionally, SLM 735 can include either a one dimensional array or pixels or a two dimensional array of pixels. Before reaching holographic media 708, signal beam 710 passes through a first 4F image system formed by cylindrical lenses 741a and 741b. The cylindrical lenses 741a and 741b are each oriented in an "x" direction such that the cylindrical axes of lenses 741a and 741b are parallel. Between cylindrical lenses 741a and 741b is cylindrical FT lens 742a oriented in a "y" direction perpendicular to the x-direction and in a direction perpendicular to the plane of FIG. 12. Both the x-direction and y-direction are perpendicular to a direction of propagation of object beam 710. Cylindrical lenses 741a and 741b image object beam 710 into circular media 708 in the x-direction and cylindrical FT lens 742a Fourier transforms object beam 710 in the y-direction to generate holograms in circular media 708 with reference beam 720. Media 708 is preferably in the form of a disk that rotates about a central axis but can also be in the shape of a card with the holograms stored along lines. Thus, holograms are overlapped in circular formation when media 708 is shifted.

As discussed above, a plurality of holograms can be multiplexed at the same location in media 708 using different reference beams to create a stack of holograms. Additionally, media 708 can be rotated to allow creation of additional stacks 752 of holograms using the same reference beams and that can overlap with each other. To readout holograms from stacks 752, a readout beam is used to transmit an output beam 711 through a filter block 730. In the example of system 700, holograms are preferably generated in media 708 such that both the image waist and Fourier transform waist of object beam 710 are located outside of media 708 at the location of filter block 730. To achieve this, the focal length of cylindrical FT lens 742 is twice the focal length of lenses 741a and 741b.

Additionally, stacks 752 of holograms are preferably overlapped in media 708 such that neither the Fourier Transform waist nor the image waist of the object beams generating the stacks 752 of holograms overlap. Thus, an aperture 730a of filter block 730 can be sized to filter out readouts of unwanted overlapped holograms from output beam 711. To accomplish this, the dimension of an aperture 730a in an x-direction is preferably the size of the image beam waist. And, the size of the slit in the y-direction is preferably the Nyquist aperture discussed above.

After passing through filter block 730, output beam 711 passed through three additional cylindrical lenses 743a, 743b and cylindrical FT lens 742b before reaching detector 746. Cylindrical lenses 743a and 743b form a second 4F system extended in the x-direction such that the cylinder axes of lenses 743a and 743b are parallel in the x-direction. Cylindrical FT lens 742b is positioned between lenses 742b and 743b and has a cylinder axis that is parallel to the y-direction. In this way, a hologram presented on SLM 735 and stored in the media is then reconstruct as an image focused on detector 746.

It is also considered that a system implementing polytopic multiplexing and having a Fourier transform in a direction perpendicular to an image direction, such as system 700, use an angular filter, such as angular filters 630a and 630b of system 600 above, and/or include more than one filter. It is also contemplated that the Fourier transform plane of object beam 710 and output beam 711 does not spatially coincide with the image plane of object beam 710 and output beam 711, respectively. In such a case, filtration for the Fourier transform plane could occur at a different location that filtration for the image plane. Also, the filters for the image plane and Fourier transform plane would be slits that extend in the direction of the respective cylindrical lens system.

It is also considered that a system implementing polytopic multiplexing and having a Fourier transform in a direction perpendicular to an image direction, such as system 700 be implemented in a phase conjugate architecture, such as system 300. Such a system could also place either one or both of the image beam waist and Fourier transform waist inside the holographic media and include a lens system to relay the respective waist outside of the media where it is filtered, such as in system 500 shown in FIGS. 9 and 10.

Various modifications to the preferred embodiments can be made without departing from the spirit and scope of the invention. For example, and without limitation, different optical arrangements and recording geometries such as reflective or transmissive geometries are contemplated. The holograms can be recorded in the media at an image plane, Fourier plane or at any intermediate plane. The media could be in the form of a disk, card, tape or any other form. The relative motion for moving the beam waist for the next stack of multiplexed holograms could be achieved by moving the media, moving the optical system, a combination of both moving media and optics or by beam steering the beams to the new location. This relative motion between stacks could be substantially linear motion, substantially a rotation, or some other trajectory. Thus the overlapping stacks could form lines, circles, ellipses, or spirals for example. Devices that are read only devices (ROMs), record only apparatus, as well as devices that record and read out are also considered. Thus, the foregoing description is not intended to limit the invention which is described in the appended claims.

What is claimed is:

1. A method for holographic recording comprising:
creating a first hologram in a holographic media using a first reference beam and a first signal beam comprising page-wise data modulated by a spatial light modulator (SLM), the first signal beam having a beam waist;
creating a second hologram using a second reference beam and a second signal beam, the second signal beam having a beam waist;
overlapping at least a portion of the second hologram with the first hologram; and
separating the first hologram from the second hologram such that substantially no portion of the beam waist of the first signal beam occurs at the same location as any portion of beam waist of the second signal beam.

2. A method for holographic recording, comprising:
creating a first hologram in a holographic media using a first reference beam and a first signal beam comprising page-wise data modulated by a spatial light modulator (SLM), the first signal beam having a beam waist;
creating a second hologram using a second reference beam and a second signal beam, the second signal beam having a beam waist;
overlapping at least a portion of the second hologram with the first hologram; and
separating the first hologram from the second hologram such that substantially no portion of the beam waist of the first signal beam occurs at the same location as any portion of beam waist of the second signal beam;
reconstructing the first hologram in a first portion of an output beam;
reconstructing at least the second hologram in a second portion of the output beam; and
filtering the output beam to substantially contain only a reconstruction of the first hologram.

3. The method of claim 2 wherein filtering the output beam includes placing a filter block in the output beam, the filter block having an aperture which allows information from the first hologram to pass through the filter block.

4. The method of claim 3 wherein:
the first portion of the output beam has a first output waist and the second portion of the output beam has a second output waist; and
filtering the output beam includes:
placing the aperture of the filter block at a location of the first output waist; and
blocking transmission of the second portion of the output beam at the second output waist.

5. The method of claim 4 wherein one dimension of the aperture is the Nyquist size.

6. The method of claim 4 wherein one dimension of the aperture is twice the Nyquist size.

7. The method of claim 2 wherein creating the first hologram includes:
placing a spatial light modulator (SLM) in the path of an incident beam to generate the first signal beam; and
placing a lens in the path of the first signal beam between the SLM and the holographic media.

8. The method of claim 7 wherein regenerating the first hologram includes using a readout beam to create the output beam wherein the readout beam is the same as the first reference beam.

9. The method of claim 8 wherein regenerating the first hologram includes using a readout beam to create the output beam, wherein the readout beam is the phase conjugate of the first reference beam.

10. The method of claim 9 including detecting a readout of the first portion of the output beam in a detector that is integrated with the SLM.

11. The method of claim 2 wherein creating the first hologram includes:
placing a spatial light modulator (SLM) in the path of an incident beam to generate the first signal beam; and
placing a lens in the path of the incident beam before the incident beam reaches the SLM; and
transmitting the signal beam from the SLM to the holographic media without passing the signal beam through a lens.

12. The method of claim 11 wherein reconstructing the first hologram includes using a readout beam to create the output beam, wherein the readout beam is the phase conjugate of the first reference beam.

13. The method of claim 12 including detecting a first portion of the output beam in a detector that is integrated with the SLM.

14. The method of claim 2 wherein filtering the output beam includes placing an angular filter in the output beam.

15. The method of claim 14 wherein the angular filter is a layered film.

16. The method of claim 14 wherein the angular filter is a holographic optical element (HOE).

17. The method of claim 14 wherein reconstructing the first hologram includes using a readout beam to create the output beam, wherein the readout beam is the phase conjugate of the first reference beam.

18. The method of claim 2 including filtering the first signal beam before forming a hologram to limit the bandwidth of the first signal beam.

19. The method of claim 18 wherein:
filtering the first signal beam includes filtering the signal beam with one of either an angular filter and a filter block; and
filtering the output beam includes filtering the output beam with one of either an angular filter and a filter block.

20. The method of claim 2 wherein:
creating the first hologram includes placing a first waist of the first signal beam inside the holographic media; and
creating the second hologram includes placing a first waist of the second signal beam inside the holographic media.

21. The method of claim 20 including:
generating a second waist of the first signal beam outside the holographic media;
generating a second waist of the output beam outside the holographic media; and
blocking the second portion of the output beam outside the holographic media at the second waist of the output beam.

22. The method of claim 21 wherein regenerating the first hologram includes using a readout beam to create the output beam wherein the readout beam is the same as the first reference beam.

23. The method of claim 21 wherein regenerating the first hologram includes using a readout beam to create the output beam, wherein the readout beam is the phase conjugate of the first reference beam.

24. The method of claim 23 including:
detecting the first portion of the output beam in a detector; and
passing the first portion of the output beam through a waveplate and a polarized beam splitter before detecting the first portion of the output beam.

25. The method of claim 20 including passing the first object beam through a phase element prior to reaching the holographic media.

26. The method of claim 2 wherein filtering the output beam includes forming a filter that is integrated with the holographic media, the filter having at least one aperture.

27. The method of claim 2 including:
locating the holographic media at an image plane of the first signal beam such that the beam waist of the first signal beam is projected into the holographic media;
projecting the first signal beam through a first angular filter before projecting the first signal beam into the holographic media; and
wherein filtering the signal beam includes projecting the output beam through a second angular filter.

28. The method of claim 27 including generating the output beam using a readout beam that is the same as the first reference beam.

29. The method of claim 1 including:
multiplexing a first plurality of holograms with the first hologram at a first multiplex location in the holographic media;
multiplexing a second plurality of holograms with the second hologram at a second multiplex location in the holographic media.

30. The method of claim 29 wherein the first plurality of holograms are angle multiplexed at the first multiplex location and the second plurality of holograms are angle multiplexed at the second multiplex location.

31. The method of claim 29 wherein the first plurality of holograms are wavelength multiplexed at the first multiplex location and the second plurality of holograms are wavelength multiplexed at the second multiplex location.

32. The method of 1 wherein:
creating the first hologram includes placing the beam waist of the first signal beam outside the holographic media; and
creating the second hologram includes placing the beam waist of the second signal beam outside the holographic media.

33. The method of claim 1 including locating the holographic media at an image plane of the first signal beam.

34. The method of claim 1 locating the holographic media at a Fourier plane of the first signal beam.

35. A method for reading out a first hologram created in a holographic media from a first signal beam comprising page-wise data modulated by a spatial light modulator (SLM) and a first reference beam, the first hologram overlapping in the holographic media with a portion of at least a second hologram created by a second signal beam and a reference beam that is the same as the first reference beam such that substantially no portion of a beam waist of the first signal beam occurs at the same location as any portion of a beam waist of the second signal beam, including:
reconstructing the first hologram in a first portion of an output beam and reconstructing at least the second hologram in a second portion of the output beam; and
filtering the output beam to substantially contain only a reconstruction of the first hologram.

36. The method of claim 35 including locating the holographic media at an image plane of the first signal beam.

37. The method of claim 35 locating the holographic media at a Fourier plane of the first signal beam.

38. The method of claim 2 including:
imaging the first signal beam on a first spot in the holographic medium in a first direction; and
Fourier transforming the first signal beam on the first spot in the holographic medium in a direction orthogonal to the first direction.

39. An apparatus for hologram recording comprising:
a spatial light modulator (SLM) located in a path of an incident beam to generate a first signal beam; the first signal beam and a first reference beam generating a first hologram in a holographic medium the first signal beam having a first beam waist;
a second signal beam and a second reference beam, the second signal beam and the second reference beam generating a second hologram in a holographic medium the second signal beam having a second beam waist, at least a portion of the first hologram spatially overlapping with at least a portion of the second hologram in the holographic media such that substantially no portion of the waist of the first signal beam occurs in the same location in the holographic media as any portion of the waist of the second signal beam.

40. An apparatus for recordation a hologram, comprising:
a first signal beam comprising page-wise data modulated by a spatial light modulator (SLM) and a first reference beam generating a first hologram in a holographic medium the first signal beam having a first beam waist;
a second signal beam and a second reference beam, the second signal beam and the second reference beam generating a second hologram in a holographic medium the second signal beam having a second beam waist, at least a portion of the first hologram spatially overlapping with at least a portion of the second hologram in the holographic media such that substantially no portion of the waist of the first signal beam occurs in the same location in the holographic media as any portion of the waist of the second signal beam;
an output beam having:
a first portion that includes a readout of the first hologram; and
a second portion that includes a readout of the second hologram; and
a filter for filtering at least the second portion out of the output beam.

41. The apparatus of claim 40 wherein the filter includes an opaque filter block having an aperture.

42. The apparatus of claim 41 wherein:
the first portion of the output beam has a first output waist and the second portion of the output beam has a second output waist; and
in reproducing the first hologram the aperture in the filter block is located at the first output waist and transmission of the second portion of the output beam is blocked at the second output waist.

43. The apparatus of claim 42 wherein one dimension of the aperture in the Nyquist size.

44. The apparatus of claim 42 wherein one dimension of the aperture is twice the Nyquist size.

45. The apparatus of claim 40 further including:
a lens located in the path of the first signal beam between a spatial light modulator SLM and the holographic media.

46. The apparatus of claim 45 further including a readout beam that generates the output beam wherein the readout beam is the same as the first reference beam.

47. The apparatus of claim 45 further including a readout beam that generates the output beam wherein the readout beam is the phase conjugate of the first reference beam.

48. The apparatus of claim 47 including a detector for detecting the output beam wherein the detector is integrated with the SLM.

49. The apparatus of claim 40 including:
an incident beam;
a spatial light modulator (SLM) located in the path of an incident beam to generate the first signal beam;
a lens located in the path of the incident beam before the incident beam reaches the SLM such that the signal beam is transmitted directly from the SLM to the holographic media without passing through any lens.

50. The apparatus of claim 49 including a readout beam to create the output beam, wherein the readout beam is the phase conjugate of the first reference beam.

51. The apparatus of claim 50 including a detector for detecting the output beam wherein the detector is integrated with the SLM.

52. The apparatus of claim 40 wherein the filter includes an angular filter.

53. The apparatus of claim 52 wherein the angular filter is formed from layers of film.

54. The apparatus of claim 52 wherein the angular filter is formed from an HOE.

55. The apparatus of claim 52 including a readout beam to generate the output beam wherein the readout beam is the phase conjugate of the first reference beam.

56. The apparatus of claim 40 including a second filter placed in the first object beam to limit the bandwidth of the first object beam.

57. The apparatus of claim 56 wherein:
the first filter includes one of either an angular filter and a filter block having an aperture; and
the first filter includes one of either an angular filter and a filter block having an aperture.

58. The apparatus of claim 40 wherein in forming the first hologram the first beam waist is located inside the holographic media and in forming the second hologram the second beam waist is located inside the holographic media.

59. The apparatus of claim 58 including:
a second beam waist of the first signal beam, the second beam waist of the first signal beam located outside of the holographic media;
a second beam waist of the output beam, the second beam waist of the output beam located outside the holographic media wherein the second portion of the output beam is blocked at the second beam waist of the output beam.

60. The apparatus of claim 59 including a readout beam used to generate the output beam, wherein the readout beam is the same as the first reference beam.

61. The apparatus of claim 59 including a readout beam used to generate the output beam, wherein the readout beam is the phase conjugate of the first reference beam.

62. The apparatus of claim 61 including:
a detector for detecting the output beam;
a polarized beam splitter located in a path of the output beam before the detector; and
a waveplate located in the path of the output beam before the polarized beam splitter.

63. The apparatus of claim 58 including a phase element located in a path of the first signal beam before the holographic media.

64. The apparatus of claim 40 wherein the filter is integrated with the holographic media.

65. The apparatus of claim 40 wherein the first signal beam includes an image plane that is projected into the holographic media.

66. The apparatus of claim 65 including a first angular filter located in a path of the first signal beam in front of the holographic media; and the filter includes a second angular filter located in a path of the output beam.

67. The apparatus of claim 66 including a readout beam that is used to generated the output beam wherein the readout beam is the same as the first reference beam.

68. The apparatus of claim 39 including:
a first plurality of holograms multiplexed with the first hologram at a location of the first hologram in the holographic media; and
a second plurality of holograms multiplexed with the second hologram at a location of the second hologram in the holographic media.

69. The method of claim 68 wherein the first plurality of holograms are angle multiplexed at the first multiplex location and the second plurality of holograms are angle multiplexed at the second multiplex location.

70. The method of claim 68 wherein the first plurality of holograms are wavelength multiplexed at the first multiplex location and the second plurality of holograms are wavelength multiplexed at the second multiplex location.

71. The apparatus of claim 39 wherein in forming the first hologram the first waist is located outside the holographic media and in forming the second hologram the second waist is located outside the holographic media.

72. The apparatus of claim 39 wherein an image plane of the first signal beam is projected inside the holographic media.

73. The apparatus of claim 39 wherein a Fourier plane of the first signal beam is projected inside the holographic media.

74. An apparatus for reading out a first hologram created in a holographic media from a first signal beam comprising page-wise data modulated by a spatial light modulator (SLM) and a reference beam, the first hologram overlapping in the holographic media with a portion of at least a second hologram created by a second signal beam and the reference beam such that substantially no portion of a beam waist of the first signal beam occurs at the same location as any portion of a beam waist of the second signal beam, including:

an output beam having:
a first portion in which the first hologram is read out; and at least a second portion in which the second hologram is read out; and
a filter in the output beam that filters the output beam to contain substantially only a reconstruction of the first hologram.

75. The apparatus of claim 74 including locating the holographic media at an image plane of the first signal beam.

76. The apparatus of claim 74 locating the holographic media at a Fourier plane of the first signal beam.

77. The apparatus of claim 39 wherein the first signal beam is imaged at an image plane of the first signal beam in a first direction on a spot in the holographic media and Fourier transformed on the spot in the holographic media in a second direction orthogonal to the first direction.

78. A holographic media including:
a first plurality of holograms multiplexed with a first hologram at a first location in the holographic media, the first hologram generated by a first signal beam comprising page-wise data modulated by a spatial light modulator (SLM) and a first reference beam, the first signal beam having a first beam waist; and
a second plurality of holograms multiplexed with a second hologram at a second location in the holographic media, the second hologram created by a second signal beam and a second reference beam that is the same as the first reference beam the second signal beam having a second beam waist, wherein a portion of the first hologram overlaps with a portion of the second hologram and the first beam waist does not substantially occur at the same location as the second beam waist.

79. The holographic media of claim 78 wherein the holographic media is in the form of a disk and the first plurality of holograms and the second plurality of holograms are overlapped in a circular formation.

80. The holographic media of claim 78 wherein the first plurality of holograms and the second plurality of holograms are overlapped in a line.

81. The holographic media of claim 80 wherein the holographic media is in the form of a card.

82. The holographic media of claim 80 wherein the holographic media is in the form of a tape.

83. A method of replicating multiplexed holograms in the holographic media of claim 78 including:
placing a blank holographic media adjacent to the holographic media of claim 78;
projecting a readout beam through the holographic media of claim 78 to generate an output beam, the readout beam being the same as the first reference beam; and
recording at least the first and second holograms into the blank holographic media using the output beam.

84. The method of claim 1, wherein the second reference beam is the same as the first reference beam.

* * * * *